United States Patent
Shih et al.

(10) Patent No.: US 10,701,655 B1
(45) Date of Patent: Jun. 30, 2020

(54) METHOD AND APPARATUS FOR APPLYING TIME ALIGNMENT TIMER LENGTH FOR PRECONFIGURED UPLINK RESOURCES IN A WIRELESS COMMUNICATION SYSTEM

(71) Applicant: ASUSTek Computer Inc., Taipei (TW)

(72) Inventors: Tun-Huai Shih, Taipei (TW); Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/689,572

(22) Filed: Nov. 20, 2019

Related U.S. Application Data

(60) Provisional application No. 62/780,123, filed on Dec. 14, 2018, provisional application No. 62/780,087, filed on Dec. 14, 2018.

(51) Int. Cl.
*H04W 56/00* (2009.01)
*H04W 76/27* (2018.01)
*H04W 74/08* (2009.01)
*H04W 76/30* (2018.01)

(52) U.S. Cl.
CPC ... *H04W 56/0045* (2013.01); *H04W 74/0833* (2013.01); *H04W 76/27* (2018.02); *H04W 76/30* (2018.02)

(58) Field of Classification Search
CPC .......................... H04W 56/0045; H04W 76/30
See application file for complete search history.

(56) References Cited

U.S. PATENT DOCUMENTS

| | | | |
|---|---|---|---|
| 2014/0112308 A1 | 4/2014 | Kwon | |
| 2018/0368046 A1* | 12/2018 | Zhang | H04W 16/32 |
| 2020/0107283 A1* | 4/2020 | Ratasuk | H04W 72/042 |
| 2020/0107396 A1* | 4/2020 | Wang | H04L 5/0082 |

* cited by examiner

*Primary Examiner* — Hassan Kizou
*Assistant Examiner* — Deepa Belur
(74) *Attorney, Agent, or Firm* — Blue Capital Law Firm, P.C.

(57) ABSTRACT

To perform successful transmission using Preconfigured Uplink Resources (PUR) in RRC_IDLE state, the UE (User Equipment) should maintain a valid timing adjustment (or timing alignment, TA). Currently the maximum of TA timer (excluding infinity value) is 10.24 seconds. In many or most cases, the TA timer will expire before the next PUR occasion occurs, resulting in the UE being unable to perform transmission using PUR. To solve such issue, the UE could apply different length for the TA timer in RRC_IDLE state. A method and apparatus are disclosed from the perspective of a User Equipment (UE). In one embodiment, the method includes the UE receiving a configuration of a first timer indicating a first length in a RRCConnectionRelease message, wherein the first timer is used to control validity of a first Timing Adjustment (TA) for a transmission using Preconfigured Uplink Resources (PUR) in RRC_IDLE state. The method also includes the UE considering the first TA as invalid in response to initiating a Random Access (RA) procedure while the UE is in the RRC_IDLE state.

21 Claims, 18 Drawing Sheets

US 10,701,655 B1

METHOD AND APPARATUS FOR APPLYING TIME ALIGNMENT TIMER LENGTH FOR PRECONFIGURED UPLINK RESOURCES IN A WIRELESS COMMUNICATION SYSTEM

CROSS-REFERENCE TO RELATED APPLICATIONS

The present Application claims the benefit of U.S. Provisional Patent Application Ser. Nos. 62/780,087 and 62/780,123 filed on Dec. 14, 2018, the entire disclosures of which are incorporated herein in its entirety by reference.

FIELD

This disclosure generally relates to wireless communication networks, and more particularly, to a method and apparatus for applying time alignment timer length for preconfigured uplink resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

To perform successful transmission using Preconfigured Uplink Resources (PUR) in RRC_IDLE state, the UE (User Equipment) should maintain a valid timing adjustment (or timing alignment, TA). Currently the maximum of TA timer (excluding infinity value) is 10.24 seconds. In many or most cases, the TA timer will expire before the next PUR occasion occurs, resulting in the UE being unable to perform transmission using PUR. To solve such issue, the UE could apply different length for the TA timer in RRC_IDLE state. A method and apparatus are disclosed from the perspective of a User Equipment (UE). In one embodiment, the method includes the UE receiving a configuration of a first timer indicating a first length in a RRCConnectionRelease message, wherein the first timer is used to control validity of a first Timing Adjustment (TA) for a transmission using Preconfigured Uplink Resources (PUR) in RRC_IDLE state. The method also includes the UE considering the first TA as invalid in response to initiating a Random Access (RA) procedure while the UE is in the RRC_IDLE state.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 V15.3.0, "Evolved Universal Terrestrial Radio Access (E-UTRA) and Evolved Universal Terrestrial Radio Access Network (E-UTRAN), Overall description, Stage 2"; TS 36.321 V15.3.0, "Evolved Universal Terrestrial Radio Access (E-UTRA); Medium Access Control (MAC) protocol specification"; RAN1#94 Chairman's Note; RAN1#94bis Chairman's Note; RAN1#95 Chairman's Note; TS 36.331 V15.3.0, "Evolved Universal Terrestrial Radio Access (E-UTRA); Radio Resource Control (RRC); Protocol specification"; TS 36.304 V15.1.0, "Evolved Universal Terrestrial Radio Access (E-UTRA); User Equipment (UE) procedures in idle mode"; and TS 36.213 V15.3.0, "Evolved Universal Terrestrial Radio Access (E-UTRA); Physical layer procedures". The standards and documents listed above are hereby expressly incorporated by reference in their entirety.

Figure 1:
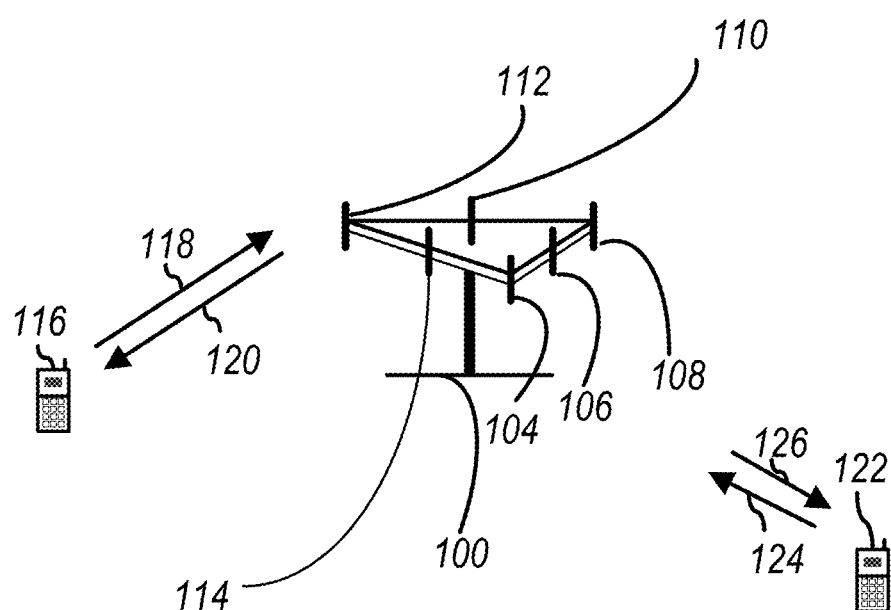
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
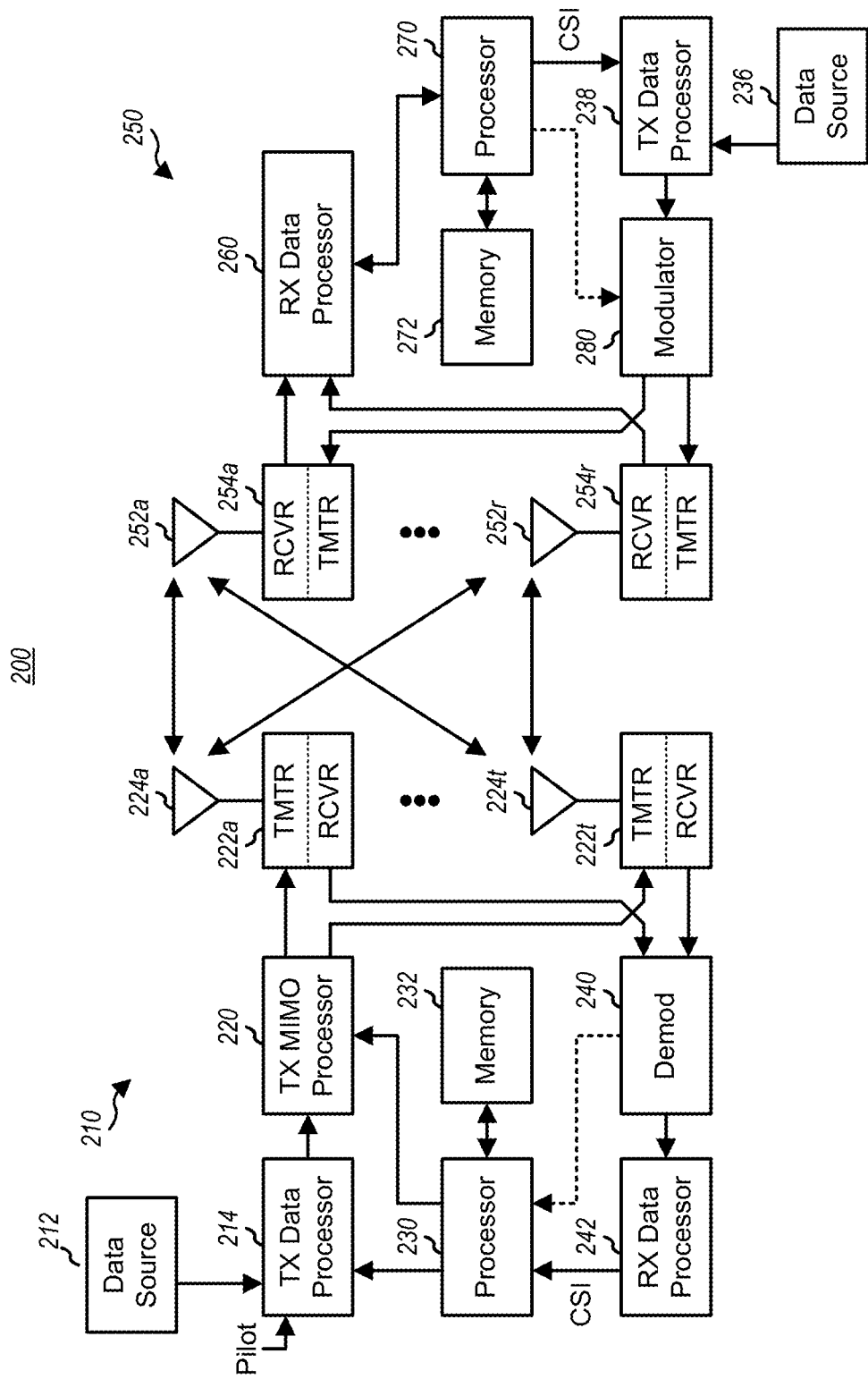
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
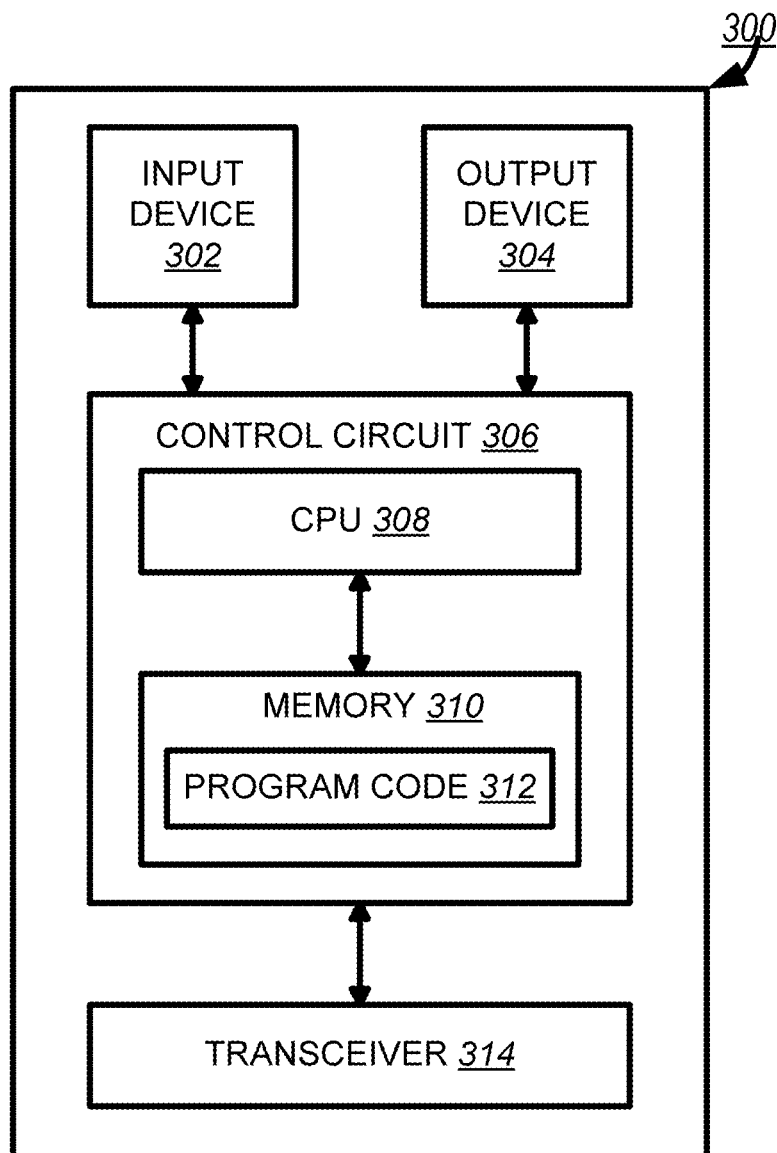
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
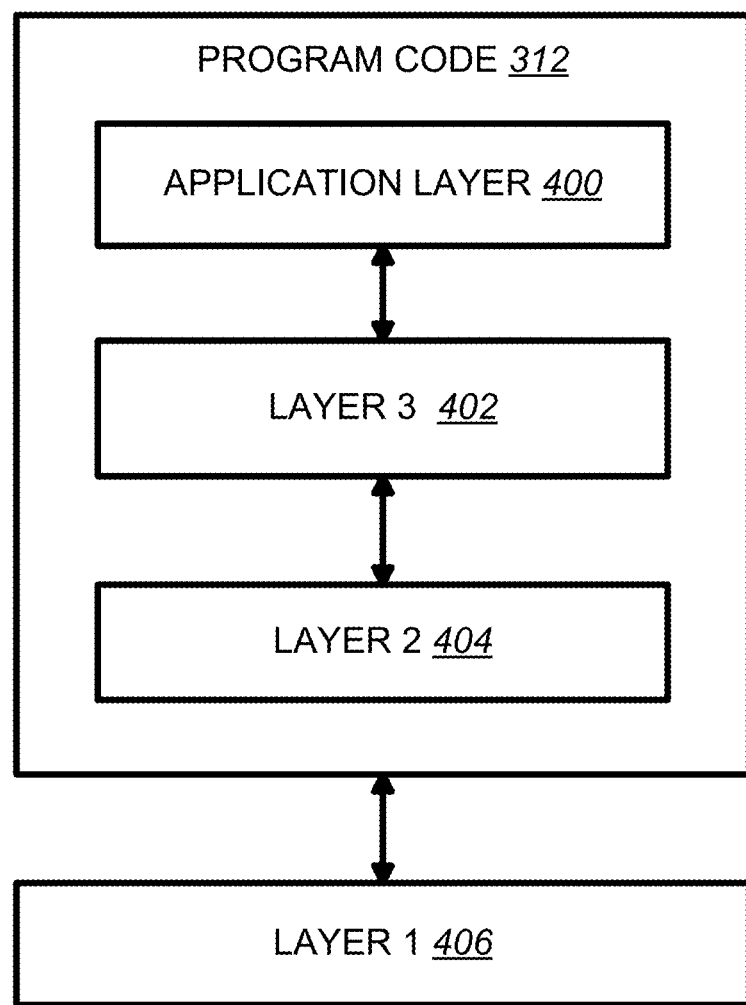
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Early Data Transmission (EDT) is introduced in LTE Release-15. 3GPP TS 36.300 V15.3.0 provides the following description related to EDT and Time Alignment (TA):
5.2 Uplink Transmission Scheme
5.2.7 Physical Channel Procedure
5.2.7.3 Uplink Timing Control The timing advance is derived from the UL received timing and sent by the eNB to the UE which the UE uses to advance/delay its timings of transmissions to the eNB so as to compensate for propagation delay and thus time align the transmissions from different UEs with the receiver window of the eNB.

The timing advance command for each TAG is on a per need basis with a granularity in the step size of 0.52 μs ($16 \times T_s$).

7.3b EDT
7.3b.1 General

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

7.3b.2 EDT for Control Plane CIoT EPS Optimizations

EDT for Control Plane CIoT EPS optimizations, as defined in TS 24.301 [20], is characterized as below:

Uplink user data are transmitted in a NAS message concatenated in UL RRCEarlyDataRequest message on CCCH;
Downlink user data are optionally transmitted in a NAS message concatenated in DL RRCEarlyDataComplete message on CCCH;
There is no transition to RRC CONNECTED.

Figure 5:
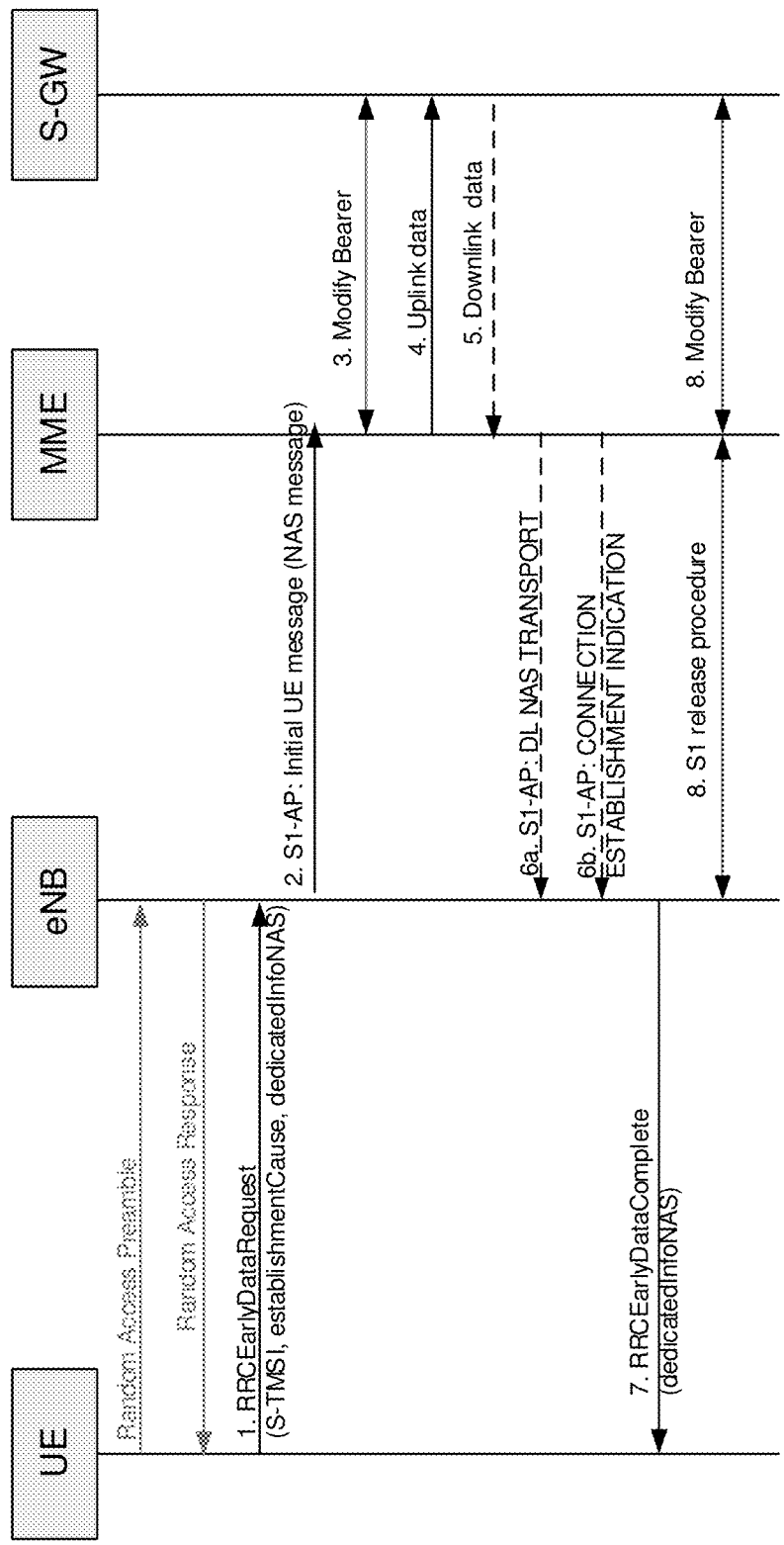
FIG. 5 is a reproduction of FIG. 7.3b-1 of 3GPP TS 36.300 V15.3.0.
Figure 7:
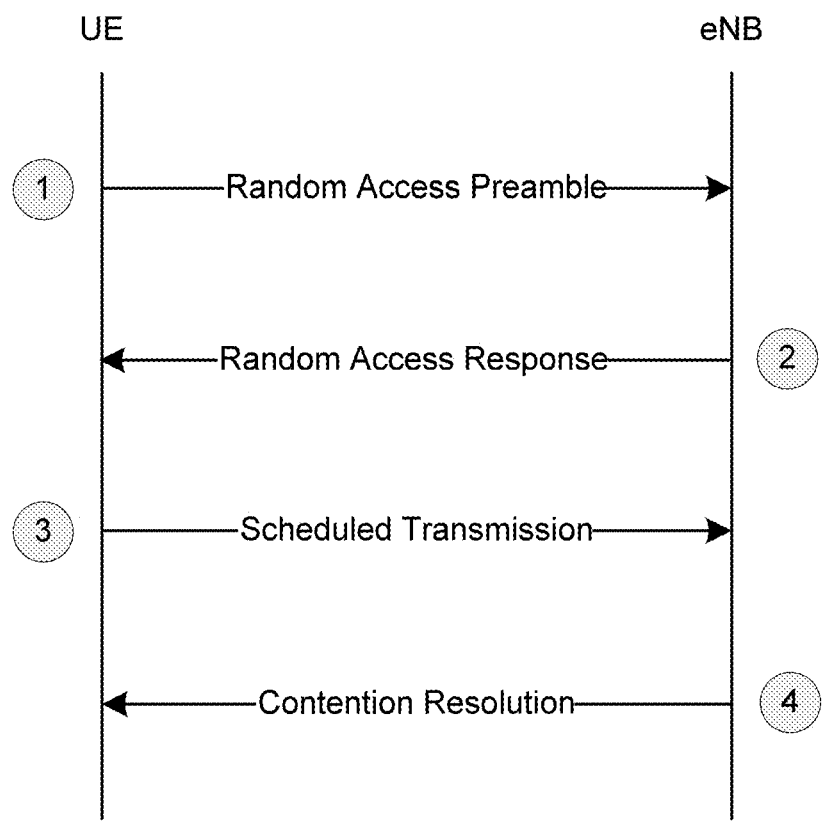
FIG. 7 is a reproduction of FIG. 10.1.5.1-1 of 3GPP TS 36.300 V15.3.0.

The EDT procedure for Control Plane CIoT EPS optimizations is illustrated in FIG. 7.3b-1.
[FIG. 7.3b-1 of 3GPP TS 36.300 V15.3.0, entitled "EDT for Control Plane CIoT EPS Optimizations", is reproduced as FIG. 5]

7.3b.3 EDT for User Plane CIoT EPS Optimizations
EDT for User Plane CIoT EPS optimizations, as defined in TS 24.301 [20], is characterized as below:

The UE has been provided with a NextHopChainingCount in the RRCConnectionRelease message with suspend indication;
Uplink user data are transmitted on DTCH multiplexed with UL RRCConnectionResumeRequest message on CCCH;
Downlink user data are optionally transmitted on DTCH multiplexed with DL RRCConnectionRelease message on DCCH;
The short resume MAC-I is reused as the authentication token for RRCConnectionResumeRequest message and is calculated using the integrity key from the previous connection;
The user data in uplink and downlink are ciphered. The keys are derived using the NextHopChainingCount provided in the RRCConnectionRelease message of the previous RRC connection;
The RRCConnectionRelease message is integrity protected and ciphered using the newly derived keys;
There is no transition to RRC CONNECTED.

Figure 6:
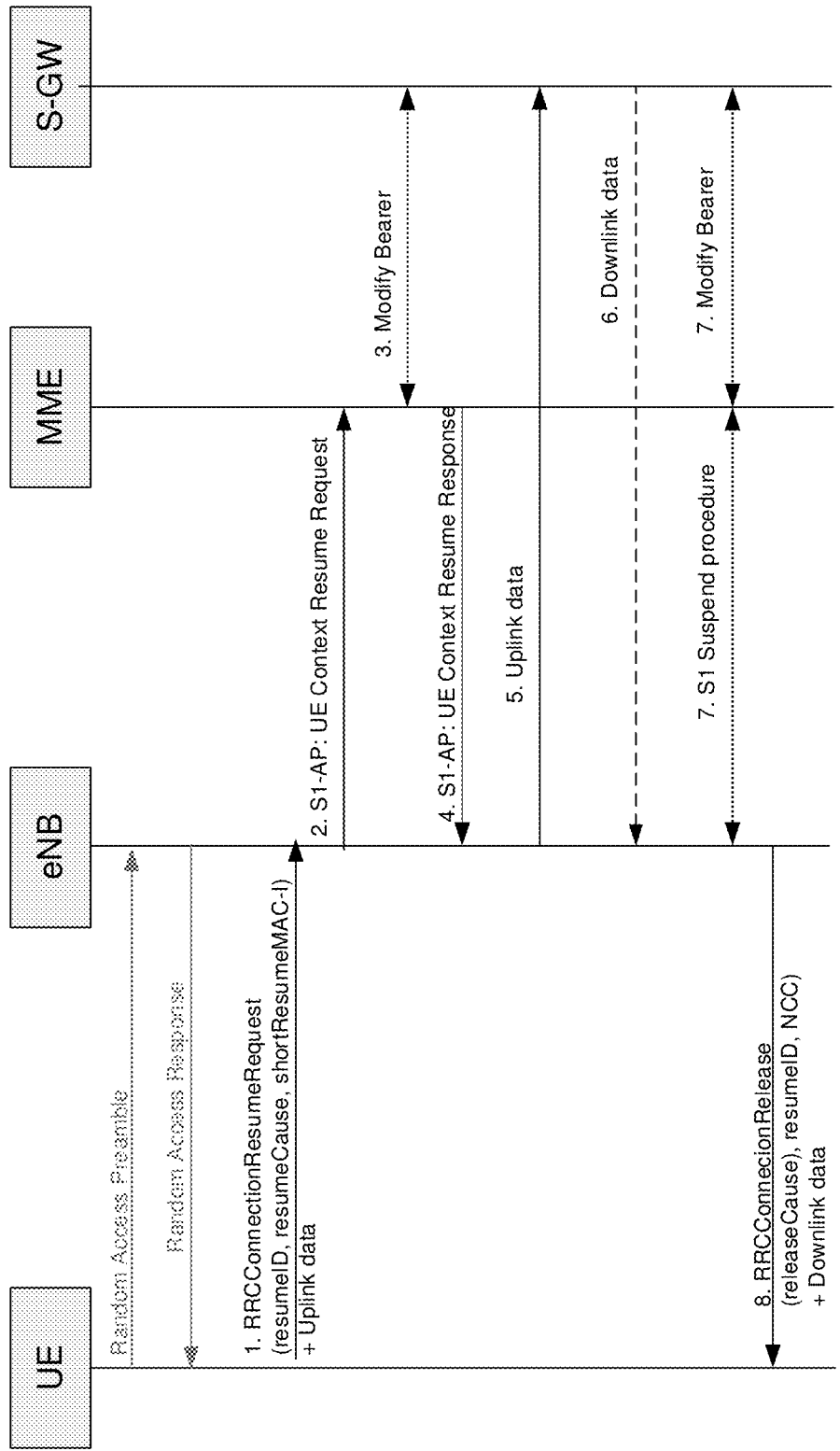
FIG. 6 is a reproduction of FIG. 7.3b-2 of 3GPP TS 36.300 V15.3.0.

The EDT procedure for User Plane CIoT EPS optimizations is illustrated in FIG. 7.3b-2.
[FIG. 7.3b-2 of 3GPP TS 36.300 V15.3.0, entitled "EDT for User Plane CIoT EPS Optimizations", is reproduced as FIG. 6]

10.1.5 Random Access Procedure
The random access procedure is characterized by:
Common procedure for FDD and TDD;
One procedure irrespective of cell size and the number of serving cells when CA is configured;
The random access procedure is performed for the following events related to the PCell:
Initial access from RRC_IDLE;
RRC Connection Re-establishment procedure, as defined in TS 24.301 [20];
Handover, except for NB-IoT or when RACH-less HO is configured;
DL data arrival during RRC_CONNECTED requiring random access procedure:
E.g. when UL synchronisation status is "non-synchronised".
UL data arrival during RRC_CONNECTED requiring random access procedure:
E.g. when UL synchronisation status is "non-synchronised" or there are no PUCCH resources for SR available.
For positioning purpose during RRC_CONNECTED requiring random access procedure:
E.g. when timing advance is needed for UE positioning.

The random access procedure is also performed on a SCell to establish time alignment for the corresponding sTAG.

For E-UTRA connected to 5GC, the random access procedure is also performed for the transition from RRC_I-NACTIVE.

In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.

Furthermore, the random access procedure takes two distinct forms:
  Contention based (applicable to all six events, but the sixth event for positioning is applicable for NB-IoT only);
  Non-contention based (applicable to only handover, DL data arrival, positioning and obtaining timing advance alignment for a sTAG).

Normal DL/UL transmission can take place after the random access procedure.

[ . . . ]

10.1.5.1 Contention Based Random Access Procedure

Figure 10:
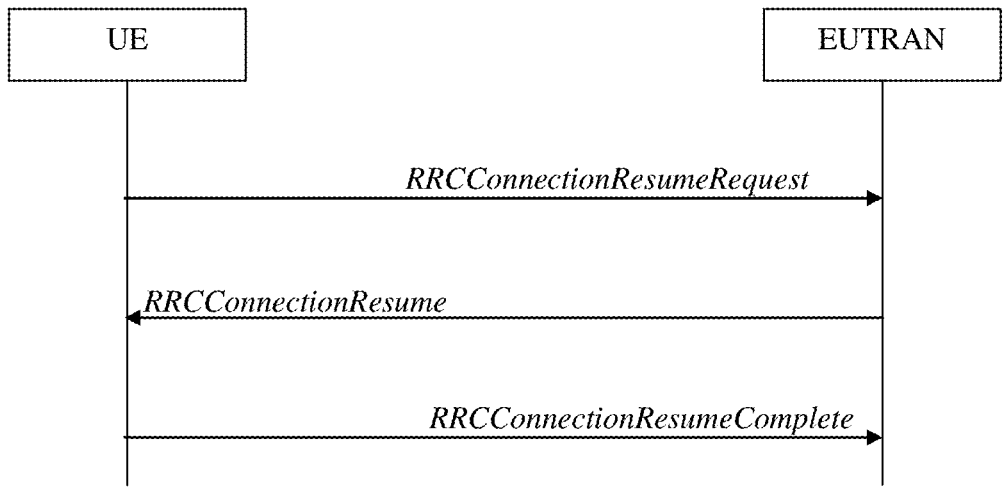
FIG. 10 is a reproduction of FIG. 5.3.3.1-3 of 3GPP TS 36.331 V15.3.0.

The contention based random access procedure is outlined on FIG. 10.1.5.1-1 below:

[FIG. 10.1.5.1-1 of 3GPP TS 36.300 V15.3.0, entitled "Contention based Random Access Procedure", is reproduced as FIG. 7]

The four steps of the contention based random access procedures are:
1) Random Access Preamble on RACH in uplink:
  There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
2) Random Access Response generated by MAC on DL-SCH:
  Semi-synchronous (within a flexible window of which the size is one or more TTI) with message 1;
  No HARQ;
  Addressed to RA-RNTI on PDCCH;
  Conveys at least RA-preamble identifier, Timing Alignment information for the pTAG, initial UL grant and assignment of Temporary C-RNTI (which may or may not be made permanent upon Contention Resolution);
  Intended for a variable number of UEs in one DL-SCH message.
3) First scheduled UL transmission on UL-SCH:
  Uses HARQ;
  Size of the transport blocks depends on the UL grant conveyed in step 2.
  For initial access:
    Conveys the RRC Connection Request generated by the RRC layer and transmitted via CCCH;
    Conveys at least NAS UE identifier but no NAS message;
    RLC TM: no segmentation.
  For RRC Connection Re-establishment procedure:
    Conveys the RRC Connection Re-establishment Request generated by the RRC layer and transmitted via CCCH;
    RLC TM: no segmentation;
    Does not contain any NAS message.
  After handover, in the target cell:
    Conveys the ciphered and integrity protected RRC Handover Confirm generated by the RRC layer and transmitted via DCCH;
    Conveys the C-RNTI of the UE (which was allocated via the Handover Command);
    Includes an uplink Buffer Status Report when possible.
  For other events:
    Conveys at least the C-RNTI of the UE;
  In the procedure to resume the RRC connection:
    Conveys the RRC Connection Resume Request generated by the RRC layer and transmitted via CCCH;
    Conveys a Resume ID to resume the RRC connection;
  For NB-IoT:
    In the procedure to setup the RRC connection:
      An indication of the amount of data for subsequent transmission(s) on SRB or DRB can be indicated.
    For EDT for Control Plane CIoT EPS Optimizations:
      Conveys the RRC Early Data Request generated by the RRC layer and transmitted via CCCH;
      Conveys NAS UE identifier and user data concatenated in a NAS message.
    For EDT for User Plane CIoT EPS Optimizations:
      Conveys the RRC Resume Request generated by the RRC layer and transmitted via CCCH;
      Conveys a Resume ID to resume the RRC connection.
    Conveys ciphered user data transmitted via DTCH.
4) Contention Resolution on DL:
  Early contention resolution shall be used i.e. eNB does not wait for NAS reply before resolving contention;
  For NB-IoT, for initial access, RRC connection resume procedure and RRC Connection Re-establishment procedure, eNB may transmit MAC PDU containing the UE contention resolution identity MAC control element without RRC response message;
  NOTE: In Release 13, NB-IoT UEs do not support the MAC PDU containing the UE contention resolution identity MAC control element without RRC response message for initial access, RRC connection resume procedure and RRC Connection Re-establishment procedure.
  Not synchronised with message 3;
  HARQ is supported;
  Addressed to:
    The Temporary C-RNTI on PDCCH for initial access and after radio link failure;
    The C-RNTI on PDCCH for UE in RRC_CONNECTED.
  HARQ feedback is transmitted only by the UE which detects its own UE identity, as provided in message 3, echoed in the Contention Resolution message;
  For initial access, RRC Connection Re-establishment procedure and EDT for Control Plane CIoT EPS Optimizations, no segmentation is used (RLC-TM).
  The Temporary C-RNTI is promoted to C-RNTI for a UE which detects RA success and does not already have a C-RNTI; it is dropped by others. A UE which detects RA success and already has a C-RNTI, resumes using its C-RNTI.

3GPP TS 36.321 V15.3.0 provides the following description related to EDT and Time Alignment (TA):

5.1 Random Access Procedure 5.1.1 Random Access Procedure Initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; [ . . . ].

[ . . . ]

The Random Access procedure shall be performed as follows:
Flush the Msg3 buffer;
set the PREAMBLE_TRANSMISSION_COUNTER to 1;
if the UE is an NB-IoT UE, a BL UE or a UE in enhanced coverage:
  set the PREAMBLE_TRANSMISSION_COUNTER CE to 1;
  if the starting enhanced coverage level, or for NB-IoT the starting number of NPRACH repetitions, has been indicated in the PDCCH order which initiated the Random Access procedure, or if the starting enhanced coverage level has been provided by upper layers:
    the MAC entity considers itself to be in that enhanced coverage level regardless of the measured RSRP;
  else:
    if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
      the MAC entity considers to be in enhanced coverage level 3;
    else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
      the MAC entity considers to be in enhanced coverage level 2;
    else if the measured RSRP is less than the RSRP threshold of enhanced coverage level 1 as configured by upper layers in rsrp-ThresholdsPrachInfoList then:
      the MAC entity considers to be in enhanced coverage level 1;
    else:
      the MAC entity considers to be in enhanced coverage level 0;
set the backoff parameter value to 0 ms;
proceed to the selection of the Random Access Resource (see subclause 5.1.2).

5.1.4 Random Access Response Reception

Once the Random Access Preamble is transmitted and regardless of the possible occurrence of a measurement gap, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding enhanced coverage level. If the UE is an NB-IoT UE and the transmission mode is FDD, in case the number of NPRACH repetitions is greater than or equal to 64, RA Response window starts at the subframe that contains the end of the last preamble repetition plus 41 subframes and has length ra-ResponseWindowSize for the corresponding enhanced coverage level, and in case the number of NPRACH repetitions is less than 64, RA Response window starts at the subframe that contains the end of the last preamble repetition plus 4 subframes and has length ra-ResponseWindowSize for the corresponding enhanced coverage level. If the UE is an NB-IoT UE and the transmission mode is TDD, RA Response window starts at the subframe that contains the end of the last preamble repetition plus 4 subframes and has length ra-ResponseWindowSize for the corresponding enhanced coverage level.

[ . . . ]

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap:
  if the Random Access Response contains a Backoff Indicator subheader:
    set the backoff parameter value as indicated by the BI field of the Backoff Indicator subheader and Table 7.2-1, except for NB-IoT where the value from Table 7.2-2 is used.
  else, set the backoff parameter value to 0 ms.
  if the Random Access Response contains a Random Access Preamble identifier corresponding to the transmitted Random Access Preamble (see subclause 5.1.3), the MAC entity shall:
    consider this Random Access Response reception successful and apply the following actions for the serving cell where the Random Access Preamble was transmitted:
      process the received Timing Advance Command (see subclause 5.2);
      indicate the preambleInitialReceivedTargetPower and the amount of power ramping applied to the latest preamble transmission to lower layers (i.e., (PREAMBLE_TRANSMISSION_COUNTER−1)*powerRampingStep);
      if the SCell is configured with ul-Configuration-r14, ignore the received UL grant otherwise process the received UL grant value and indicate it to the lower layers;
      if, except for NB-IoT, ra-PreambleIndex was explicitly signalled and it was not 000000 (i.e., not selected by MAC):

consider the Random Access procedure successfully completed.
else if, the UE is an NB-IoT UE, ra-PreambleIndex was explicitly signalled and it was not 000000 (i.e., not selected by MAC) and ra-CFRA-Config is configured:
consider the Random Access procedure successfully completed.
the UL grant provided in the Random Access Response message is valid only for the configured carrier.
else:
if the Random Access Preamble was selected by the MAC entity; or
if the UE is an NB-IoT UE, the ra-PreambleIndex was explicitly signalled and it was not 000000 and ra-CFRA-Config is not configured:
set the Temporary C-RNTI to the value received in the Random Access Response message no later than at the time of the first transmission corresponding to the UL grant provided in the Random Access Response message;
if the Random Access Preamble associated with EDT was transmitted and UL grant provided in the Random Access Response message is not for EDT:
indicate to upper layers that EDT is cancelled due to UL grant not being for EDT;
flush the Msg3 buffer.
if this is the first successfully received Random Access Response within this Random Access procedure; or
if EDT is cancelled due to the UL grant provided in the Random Access Response message not being for EDT:
if the transmission is not being made for the CCCH logical channel, indicate to the Multiplexing and assembly entity to include a C-RNTI MAC control element in the subsequent uplink transmission;
obtain the MAC PDU to transmit from the "Multiplexing and assembly" entity and store it in the Msg3 buffer.

5.2 Maintenance of Uplink Time Alignment

The MAC entity has a configurable timer timeAlignmentTimer per TAG. The timeAlignmentTimer is used to control how long the MAC entity considers the Serving Cells belonging to the associated TAG to be uplink time aligned [8].

The MAC entity shall:
when a Timing Advance Command MAC control element is received and if a $N_{TA}$ has been stored or maintained with the indicated TAG:
apply the Timing Advance Command for the indicated TAG;
start or restart the timeAlignmentTimer associated with the indicated TAG.
when a Timing Advance Command is received in a Random Access Response message for a serving cell belonging to a TAG:
if the Random Access Preamble was not selected by the MAC entity:
apply the Timing Advance Command for this TAG;
start or restart the timeAlignmentTimer associated with this TAG.
else, if the timeAlignmentTimer associated with this TAG is not running:
apply the Timing Advance Command for this TAG;
start the timeAlignmentTimer associated with this TAG;
when the contention resolution is considered not successful as described in subclause 5.1.5, stop timeAlignmentTimer associated with this TAG.
else:
ignore the received Timing Advance Command.
[ . . . ]
when a timeAlignmentTimer expires:
if the timeAlignmentTimer is associated with the pTAG:
flush all HARQ buffers for all serving cells;
notify RRC to release PUCCH/SPUCCH for all serving cells;
notify RRC to release SRS for all serving cells;
for NB-IoT, notify RRC to release all dedicated resources for SR;
clear any configured downlink assignments and uplink grants;
consider all running timeAlignmentTimers as expired;
[ . . . ]
The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.
[ . . . ]
NOTE: A MAC entity stores or maintains $N_{TA}$ upon expiry of associated timeAlignmentTimer, where $N_{TA}$ is defined in [7]. The MAC entity applies a received Timing Advance Command MAC control element and starts associated timeAlignmentTimer also when the timeAlignmentTimer is not running.

3GPP TS 36.331 V15.3.0 provides the following description related to EDT and Time Alignment (TA):

5.3.3 RRC Connection Establishment
5.3.3.1 General

Figure 8:
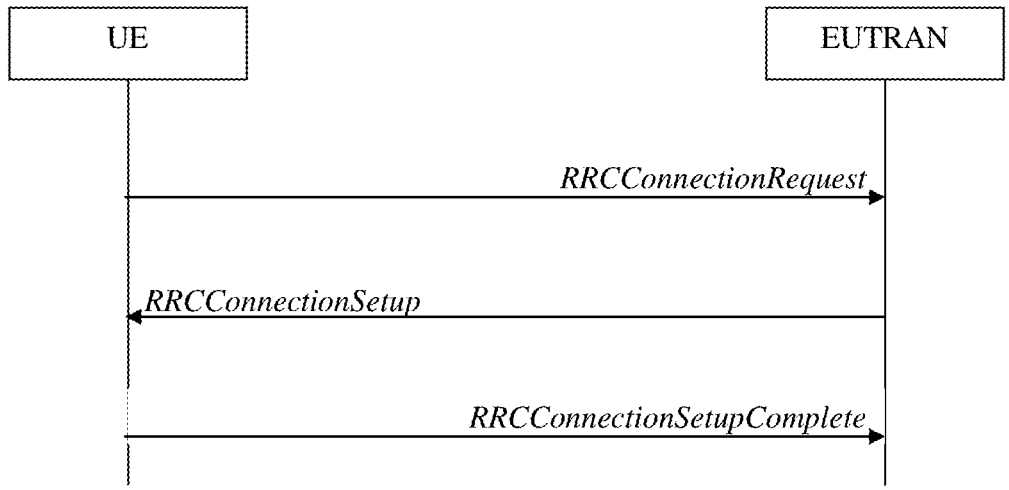
FIG. 8 is a reproduction of FIG. 5.3.3.1-1 of 3GPP TS 36.331 V15.3.0.

[FIG. 5.3.3.1-1 of 3GPP TS 36.331 V15.3.0, entitled "RRC connection establishment, successful", is reproduced as FIG. 8]

Figure 9:
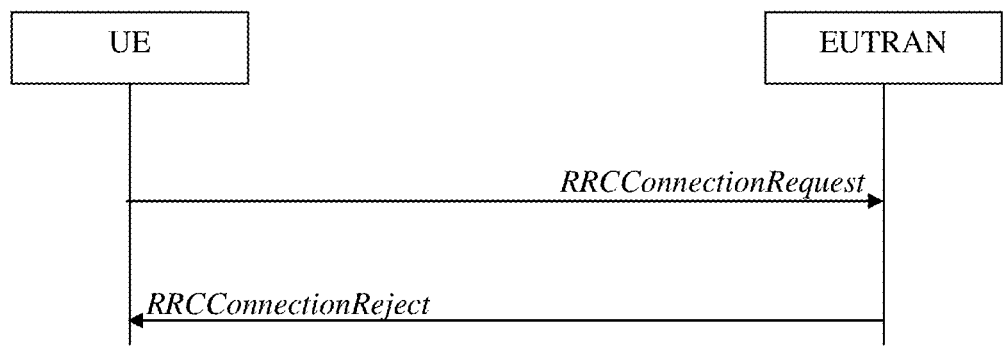
FIG. 9 is a reproduction of FIG. 5.3.3.1-2 of 3GPP TS 36.331 V15.3.0.

[FIG. 5.3.3.1-2 of 3GPP TS 36.331 V15.3.0, entitled "RRC connection establishment, network reject", is reproduced as FIG. 9]

[FIG. 5.3.3.1-3 of 3GPP TS 36.331 V15.3.0, entitled "RRC connection resume (suspended RRC connection or RRC_INACTIVE), or UP-EDT fallback to RRC connection resume, successful", is reproduced as FIG. 10]

Figure 11:
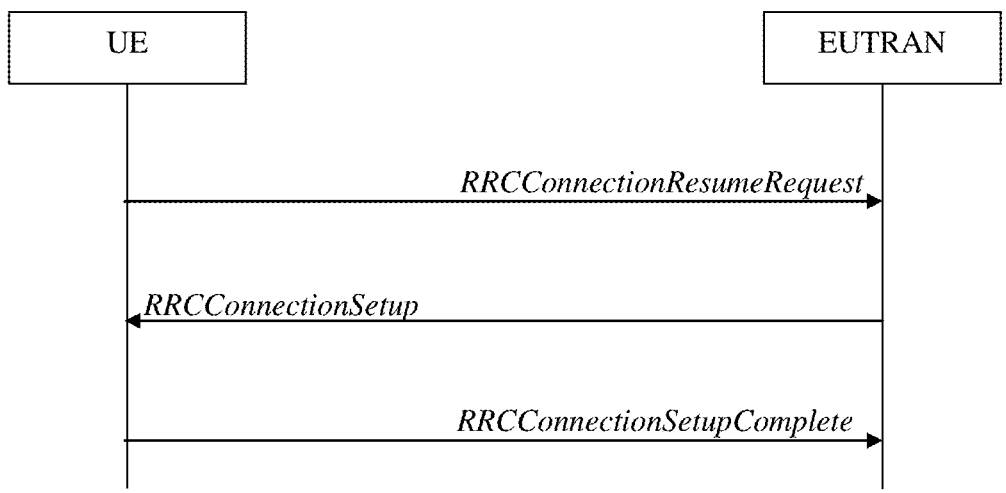
FIG. 11 is a reproduction of FIG. 5.3.3.1-4 of 3GPP TS 36.331 V15.3.0.

[FIG. 5.3.3.1-4 of 3GPP TS 36.331 V15.3.0, entitled "RRC connection resume (suspended RRC connection or RRC_INACTIVE) or UP-EDT fallback to RRC connection establishment, successful", is reproduced as FIG. 11]

Figure 12:
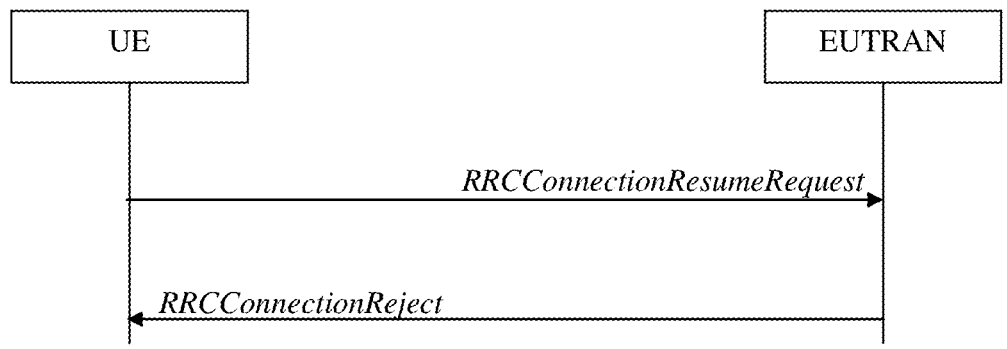
FIG. 12 is a reproduction of FIG. 5.3.3.1-5 of 3GPP TS 36.331 V15.3.0.

[FIG. 5.3.3.1-5 of 3GPP TS 36.331 V15.3.0, entitled "RRC connection resume or UP-EDT, network reject (suspended RRC connection or RRC_INACTIVE) or release (suspended RRC connection)", is reproduced as FIG. 12]

Figure 13:
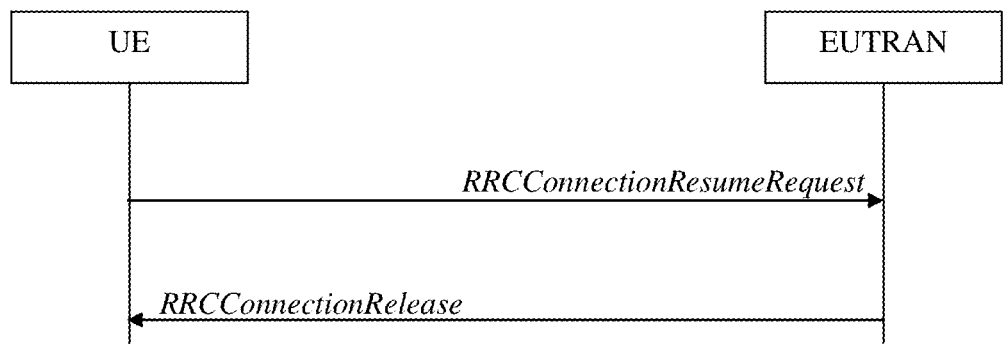
FIG. 13 is a reproduction of FIG. 5.3.3.1-6 of 3GPP TS 36.331 V15.3.0.

[FIG. 5.3.3.1-6 of 3GPP TS 36.331 V15.3.0, entitled "RRC connection resume (RRC_INACTIVE), network release or suspend or UP-EDT, successful", is reproduced as FIG. 13]

Figure 14:
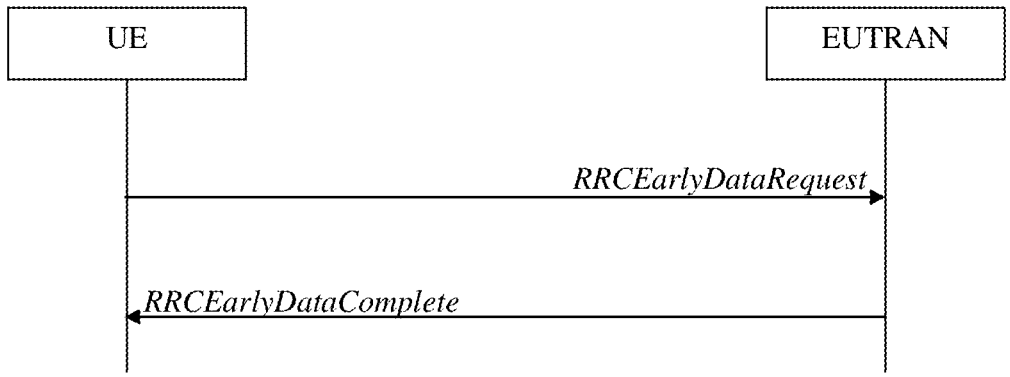
FIG. 14 is a reproduction of FIG. 5.3.3.1-7 of 3GPP TS 36.331 V15.3.0.

[FIG. 5.3.3.1-7 of 3GPP TS 36.331 V15.3.0, entitled "CP-EDT, successful", is reproduced as FIG. 14]

Figure 15:
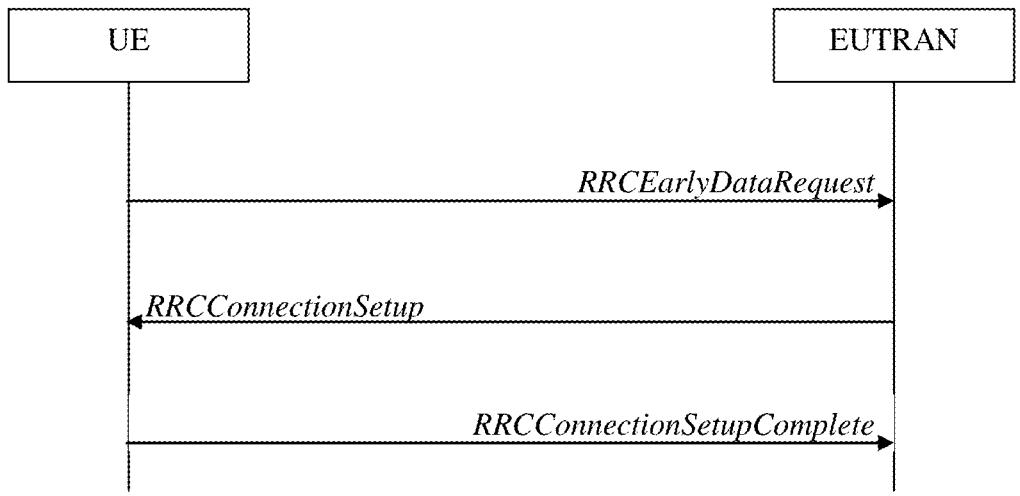
FIG. 15 is a reproduction of FIG. 5.3.3.1-8 of 3GPP TS 36.331 V15.3.0.

[FIG. 5.3.3.1-8 of 3GPP TS 36.331 V15.3.0, entitled "CP-EDT fallback to RRC connection establishment, successful", is reproduced as FIG. 15]

Figure 16:
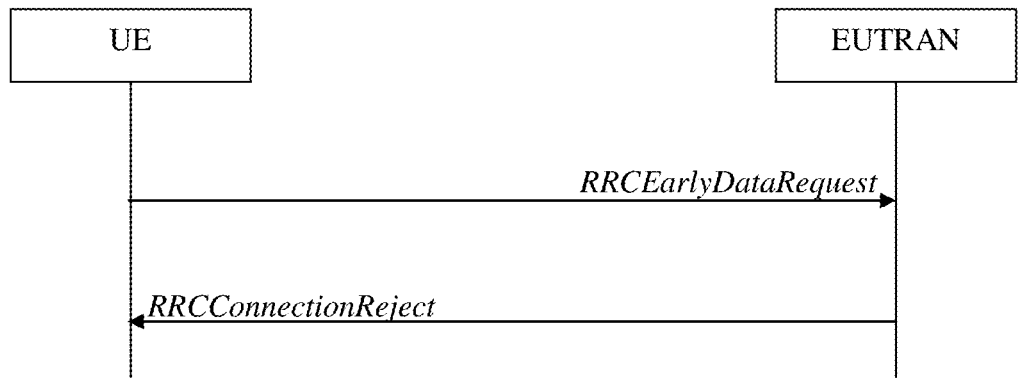
FIG. 16 is a reproduction of FIG. 5.3.3.1-9 of 3GPP TS 36.331 V15.3.0.

[FIG. 5.3.3.1-9 of 3GPP TS 36.331 V15.3.0, entitled "CP-EDT, network reject", is reproduced as FIG. 16]

The purpose of this procedure is to establish an RRC connection, to resume a suspended RRC connection, to move the UE from RRC_INACTIVE to RRC_CONNECTED or to perform EDT. RRC connection establishment involves SRB1 (and SRB1bis for NB-IoT) establishment. The procedure is also used to transfer the initial NAS dedicated information/message from the UE to E-UTRAN.

E-UTRAN applies the procedure as follows:
  When establishing an RRC connection:
    to establish SRB1 and, for NB-IoT, SRB1bis;
  When resuming an RRC connection from a suspended RRC connection or from RRC_INACTIVE:
    to restore the AS configuration from a stored context including resuming SRB(s) and DRB(s);
  When performing EDT.

5.3.3.1b Conditions for Initiating EDT

A BLUE, UE in CE or NB-IoT UE can initiate EDT when all of the following conditions are fulfilled:
  1> for CP-EDT, the upper layers request establishment of an RRC connection, the UE supports CP-EDT, and SystemInformationBlockType2 (SystemInformationBlockType2-NB in NB-IoT) includes cp-EDT; or
  1> for UP-EDT, the upper layers request resumption of an RRC connection, the UE supports UP-EDT, SystemInformationBlockType2 (SystemInformationBlockType2-NB in NB-IoT) includes up-EDT, and the UE has a stored value of the nextHopChainingCount provided in the RRCConnectionRelease message with suspend indication during the preceding suspend procedure;
  1> the establishment or resumption request is for mobile originating calls and the establishment cause is mo-Data or mo-ExceptionData or delayTolerantAccess;
  1> SystemInformationBlockType2 (SystemInformationBlockType2-NB in NB-IoT) includes edt-Parameters;
  1> the size of the resulting MAC PDU including the total UL data is expected to be smaller than or equal to the TBS signalled in edt-TBS as specified in TS 36.321 [6, 5.1.1];
  1> EDT fallback indication has not been received from lower layers for this establishment or resumption procedure;

3GPP TS 36.213 V15.3.0 provides the following description related to EDT and Time Alignment (TA):

4.2 Timing Synchronization
[ . . . ]

4.2.3 Transmission Timing Adjustments

Upon reception of a timing advance command or a timing adjustment indication for a TAG containing the primary cell or PSCell, the UE shall adjust uplink transmission timing for PUCCH/PUSCH/SRS of the primary cell or PSCell based on the received timing advance command or a timing adjustment indication.

The UL transmission timing for PUSCH/SRS of a secondary cell is the same as the primary cell if the secondary cell and the primary cell belong to the same TAG. If the primary cell in a TAG has a frame structure type 1 and a secondary cell in the same TAG has a frame structure type 2 or frame structure 3, UE may assume that $N_{TA} \geq 624$.

If the UE is configured with a SCG, the UL transmission timing for PUSCH/SRS of a secondary cell other than the PSCell is the same as the PSCell if the secondary cell and the PSCell belong to the same TAG.

Upon reception of a timing advance command or a timing adjustment indication for a TAG not containing the primary cell or PSCell, if all the serving cells in the TAG have the same frame structure type, the UE shall adjust uplink transmission timing for PUSCH/SRS of all the secondary cells in the TAG based on the received timing advance command or a timing adjustment indication where the UL transmission timing for PUSCH/SRS is the same for all the secondary cells in the TAG.

Upon reception of a timing advance command or a timing adjustment indication for a TAG not containing the primary cell or PSCell, if a serving cell in the TAG has a different frame structure type compared to the frame structure type of another serving cell in the same TAG, the UE shall adjust uplink transmission timing for PUSCH/SRS of all the secondary cells in the TAG by using $N_{TAoffset}=624$ regardless of the frame structure type of the serving cells and based on the received timing advance command or a timing adjustment indication where the UL transmission timing for PUSCH/SRS is the same for all the secondary cells in the TAG. $N_{TAoffset}$ is described in [3].

The timing adjustment indication specified in [11] indicates the initial $N_{TA}$ used for a TAG. The timing advance command for a TAG indicates the change of the uplink timing relative to the current uplink timing for the TAG as multiples of $16T_s$. The start timing of the random access preamble is specified in [3].

In case of random access response, an 11-bit timing advance command [8], $T_A$, for a TAG indicates $N_{TA}$ values by index values of $T_A=0, 1, 2, \ldots, 256$ if the UE is configured with a SCG, and $T_A=0, 1, 2, \ldots, 1282$ otherwise, where an amount of the time alignment for the TAG is given by $N_{TA}=T_A \times 16$. $N_{TA}$ is defined in [3].

In other cases, a 6-bit timing advance command [8], $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31) \times 16$. Here, adjustment of $N_{TA}$ value by a positive or a negative amount indicates advancing or delaying the uplink transmission timing for the TAG by a given amount respectively.

For a non-BL/CE UE, for a timing advance command received on
  subframe n, the corresponding adjustment of the uplink transmission timing shall apply from the beginning of subframe n+5 if the UE is configured with higher layer parameter shortProcessingTime and the corresponding PDCCH with CRC scrambled by C-RNTI is in the UE-specific search space, n+6 otherwise.
  slot n, the corresponding adjustment of the uplink transmission timing shall apply from the first subframe boundary no earlier than slot [n+8].
  subslot n, the corresponding adjustment of the uplink transmission timing shall apply from the first subframe boundary no earlier than
    subslot [n+16] if higher layer parameter proc-TimeAdv-r15='nplus4set1'.
    subslot [n+18] if higher layer parameter proc-TimeAdv-r15='nplus6set1' or 'nplus6set2'.
    subslot [n+20] if higher layer parameter proc-TimeAdv-r15='nplus8set2'.

For serving cells in the same TAG, when the UE's uplink PUCCH/PUSCH/SRS transmissions in subframe n and subframe n+1 are overlapped due to the timing adjustment, the UE shall complete transmission of subframe n and not transmit the overlapped part of subframe n+1. For a BL/CE UE, for a timing advance command received on subframe n, the corresponding adjustment of the uplink transmission timing shall apply for the uplink PUCCH/PUSCH/SRS transmissions in subframe n+6. When the BL/CE UE's uplink PUCCH/PUSCH/SRS transmissions in subframe n and subframe n+1 are on the same narrowband and are overlapped due to the timing adjustment, the UE shall complete transmission of subframe n and is not required to transmit in subframe n+1 until the first available symbol that has no overlapping portion with subframe n. When the BL/CE UE's uplink PUCCH/PUSCH/SRS transmissions in subframe n and subframe n+1 are on different narrowbands, and the timing adjustment occurs in the guard period for narrowband retuning, the UE is not required to transmit in subframe n+1 until the first available symbol that has no overlapping portion with subframe n and which does not reduce the guard period.

If the received downlink timing changes and is not compensated or is only partly compensated by the uplink timing adjustment without timing advance command as specified in [10], the UE changes $N_{TA}$ accordingly.

Figure 17:
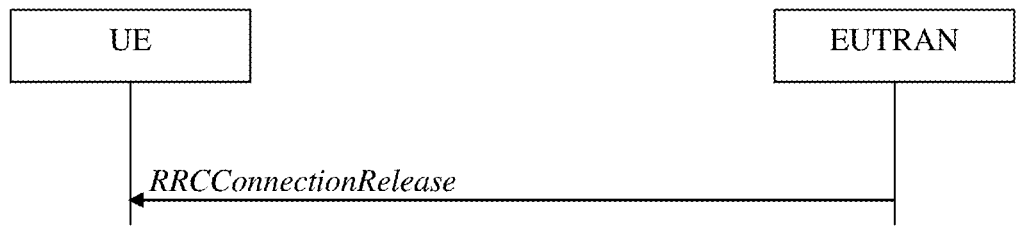
FIG. 17 is a reproduction of FIG. 5.3.8.1-1 of 3GPP TS 36.331 V15.3.0.

3GPP TS 36.331 V15.3.0 provides the following description related to state transition from RRC_CONNECTED to RRC_IDLE caused by a RRC connection release procedure:

5.3.8 RRC Connection Release
5.3.8.1 General
  [FIG. 5.3.8.1-1 of 3GPP TS 36.331 V15.3.0, entitled "RRC connection release, successful", is reproduced as FIG. 17]
  The purpose of this procedure is:
    to release the RRC connection, which includes the release of the established radio bearers as well as all radio resources; or
    to suspend the RRC connection for both suspended RRC connection or RRC_INACTIVE, which includes the suspension of the established radio bearers.
5.3.8.2 Initiation
  E-UTRAN initiates the RRC connection release procedure to a UE in RRC_CONNECTED or in RRC_INACTIVE.
5.3.8.3 Reception of the RRCConnectionRelease by the UE
  The UE shall:
    1> except for NB-IoT, BL UEs or UEs in CE, delay the following actions defined in this sub-clause 60 ms from the moment the RRCConnectionRelease message was received or optionally when lower layers indicate that the receipt of the RRCConnectionRelease message has been successfully acknowledged, whichever is earlier;
    1> for BL UEs or UEs in CE, delay the following actions defined in this sub-clause 1.25 seconds from the moment the RRCConnectionRelease message was received or optionally when lower layers indicate that the receipt of the RRCConnectionRelease message has been successfully acknowledged, whichever is earlier;
    1> for NB-IoT, delay the following actions defined in this sub-clause 10 seconds from the moment the RRCConnectionRelease message was received or optionally when lower layers indicate that the receipt of the RRCConnectionRelease message has been successfully acknowledged, whichever is earlier.
    NOTE: For BL UEs, UEs in CE and NB-IoT, when STATUS reporting, as defined in TS 36.322 [7], has not been triggered and the UE has sent positive HARQ feedback (ACK), as defined in TS 36.321 [6], the lower layers can be considered to have indicated that the receipt of the RRCConnectionRelease message has been successfully acknowledged.
    1> if the RRCConnectionRelease message is received in response to an RRCConnectionResumeRequest for EDT:
      2> discard the stored UE AS context and resumeIdentity;
      2> stop timer T300;
      2> stop timer T302, if running;
      2> stop timer T303, if running;
      2> stop timer T305, if running;
      2> stop timer T306, if running;
      2> stop timer T308, if running;
      2> perform the actions as specified in 5.3.3.7;
      2> stop timer T320, if running;
      2> stop timer T322, if running;
    1> if the RRCConnectionRelease message includes redirectedCarrierInfo indicating redirection to geran; or
    1> if the RRCConnectionRelease message includes idleModeMobilityControlInfo including freqPriorityListGERAN:
      2> if AS security has not been activated; and
      2> if upper layers indicate that redirect to GERAN without AS security is not allowed or if the UE is connected to 5GC:
        3> ignore the content of the RRCConnectionRelease;
        3> perform the actions upon leaving RRC_CONNECTED or RRC_INACTIVE as specified in 5.3.12, with release cause 'other', upon which the procedure ends;
    1> if AS security has not been activated:
      2> ignore the content of redirectedCarrierInfo, if included and indicating redirection to nr;
      2> ignore the content of idleModeMobilityControlInfo, if included and including freqPriorityListNR;
      2> if the UE ignores the content of redirectedCarrierInfo or of idleModeMobilityControlInfo:
        3> perform the actions upon leaving RRC_CONNECTED as specified in 5.3.12, with release cause 'other', upon which the procedure ends;
    1> if the RRCConnectionRelease message includes redirectedCarrierInfo indicating redirection to eutra and if UE is connected to 5GC:
      2> if cn-Type is included:
        3> the received cn-Type is provided to upper layers;
    NOTE 1: Handling the case if the E-UTRA cell selected after the redirection does not support the core network type specified by the cn-Type, is up to UE implementation.
    1> if the RRCConnectionRelease message includes the idleModeMobilityControlInfo:
      2> store the cell reselection priority information provided by the idleModeMobilityControlInfo;
      2> if the t320 is included:
        3> start timer T320, with the timer value set according to the value of t320;
    1> else:
      2> apply the cell reselection priority information broadcast in the system information;
    1> if the RRCConnectionRelease message includes the measIdleConfig:
      2> clear VarMeasIdleConfig and VarMeasIdleReport;
      2> store the received measIdleDuration in VarMeasIdleReport;
      2> start T331 with the value of measIdleDuration;

2> if the measidleConfig contains measidleCarrierLis-tEUTRA:
   3> store the received measidleCarrierListEUTRA in VarMeasidleConfig;
2> else:
   3> store the measidleCarrierListEUTRA received in SIB5 in VarMeasidleConfig;
2> start performing idle mode measurements as specified in 5.6.20;
1> for NB-IoT, if the RRCConnectionRelease message includes the redirectedCarrierInfo:
   2> if the redirectedCarrierOffsetDedicated is included in the redirectedCarrierInfo:
      3> store the dedicated offset for the frequency in redirectedCarrierInfo;
      3> start timer T322, with the timer value set according to the value of T322 in redirectedCarrierInfo;
1> if the releaseCause received in the RRCConnection-Release message indicates loadBalancingTAURequired:
   2> perform the actions upon leaving RRC_CONNECTED as specified in 5.3.12, with release cause 'load balancing TAU required';
1> else if the releaseCause received in the RRCConnectionRelease message indicates cs-FallbackHighPriority:
   2> perform the actions upon leaving RRC_CONNECTED as specified in 5.3.12, with release cause 'CS Fallback High Priority';
1> else:
   2> if the extended Wait Time is present; and
   2> if the UE supports delay tolerant access or the UE is a NB-IoT UE:
      3> forward the extended Wait Time to upper layers;
   2> if the extended Wait Time-CPdata is present and the NB-IoT UE only supports the Control Plane CIoT EPS optimisation:
      3> forward the extended Wait Time-CPdata to upper layers;
   2> if the releaseCause received in the RRCConnectionRelease message indicates rrc-Suspend:
      3> if rrc-InactiveConfig is included:
         4> perform the actions upon entering RRC_INACTIVE as specified in 5.3.8.7;
      3> else:
         4> perform the actions upon leaving RRC_CONNECTED as specified in 5.3.12, with release cause 'RRC suspension';
   2> else:
      3> perform the actions upon leaving RRC_CONNECTED or RRC_INACTIVE as specified in 5.3.12, with release cause 'other';

5.3.12 UE Actions Upon Leaving RRC_CONNECTED or RRC_INACTIVE

Upon entering RRC_IDLE, the UE shall:
1> reset MAC;
1> stop all timers that are running except T320, T322, T325, T330;
1> if leaving RRC_CONNECTED was triggered by suspension of the RRC:
   2> re-establish RLC entities for all SRBs and DRBs, including RBs configured with NR PDCP;
   2> store the UE AS Context including the current RRC configuration, the current security context, the PDCP state including ROHC state, C-RNTI used in the source PCell, the cellIdentity and the physical cell identity of the source PCell;
   2> store the following information provided by E-UTRAN:
      3> the resumeIdentity;
      3> the nextHopChainingCount, if present;
      3> the drb-ContinueROHC, if present;
   2> suspend all SRB(s) and DRB(s), including RBs configured with NR PDCP, except SRB0;
   2> indicate the suspension of the RRC connection to upper layers;
   2> configure lower layers to suspend integrity protection and ciphering;
   NOTE 1: Ciphering is not applied for the subsequent RRCConnectionResume message used to resume the connection. An integrity check is performed by lower layers, but merely upon request from RRC.
1> else:
   2> release all radio resources, including release of the RLC entity, the MAC configuration and the associated PDCP entity for all established RBs;
   2> indicate the release of the RRC connection to upper layers together with the release cause;
1> if leaving RRC_CONNECTED was triggered neither by reception of the MobilityFromEUTRACommand message nor by selecting an inter-RAT cell while T311 was running:
   2> if timer T350 is configured:
      3> start timer T350;
      3> apply rclwi-Configuration if configured, otherwise apply the wlan-Id-List corresponding to the RPLMN included in SystemInformationBlock-Type17;
   2> else:
      3> release the wlan-OffloadConfigDedicated, if received;
      3> if the wlan-OffloadConfigCommon corresponding to the RPLMN is broadcast by the cell:
         4> apply the wlan-OffloadConfigCommon corresponding to the RPLMN included in SystemInformationBlockType17;
         4> apply steerToWLAN if configured, otherwise apply the wlan-Id-List corresponding to the RPLMN included in SystemInformationBlock-Type17;
   2> enter RRC_IDLE and perform procedures as specified in TS 36.304 [4, 5.2.7];
1> else:
   2> release the wlan-OffloadConfigDedicated, if received;
   NOTE 2: BL UEs or UEs in CE verifies validity of SI when released to RRC_IDLE.
1> release the LWA configuration, if configured, as described in 5.6.14.3;
1> release the LWIP configuration, if configured, as described in 5.6.17.3;

3GPP TS 36.321 V15.3.0 provides the following description related to actions of MAC reset performed during the state transition:

5.9 MAC Reset

If a reset of the MAC entity is requested by upper layers, the MAC entity shall:
initialize Bj for each logical channel to zero;
stop (if running) all timers;
consider all timeAlignmentTimers as expired and perform the corresponding actions in subclause 5.2;
set the NDIs for all uplink HARQ processes to the value 0;
stop, if any, ongoing RACH procedure;

discard explicitly signalled ra-PreambleIndex and ra-PRACH-MaskIndex, if any;
flush Msg3 buffer;
cancel, if any, triggered Scheduling Request procedure;
cancel, if any, triggered Buffer Status Reporting procedure;
cancel, if any, triggered Power Headroom Reporting procedure;
flush the soft buffers for all DL HARQ processes;
for each DL HARQ process, consider the next received transmission for a TB as the very first transmission;
release, if any, Temporary C-RNTI.

If a partial reset of the MAC entity is requested by upper layers, for a serving cell, the MAC entity shall for the serving cell:
set the NDIs for all uplink HARQ processes to the value 0;
flush all UL HARQ buffers;
stop all running drx-ULRetransmissionTimers;
stop all running UL HARQ RTT timers;
stop, if any, ongoing RACH procedure;
discard explicitly signalled ra-PreambleIndex and ra-PRACH-MaskIndex, if any;
flush Msg3 buffer;
release, if any, Temporary C-RNTI.

Transmission in preconfigured uplink resources (PUR) is discussed in 3GPP RAN1. As described in the 3GPP RAN1#94 Chairman's Note, the following agreements were made by RAN1.
Agreement
 Idle mode based pre-configured UL resources is supported for UEs in possession of a valid TA
  FFS: Validation mechanism for TA
  FFS: How the pre-configured UL resources is acquired
Agreement
 For transmission in preconfigured UL resources, the UE may use the latest TA of which its validity can be confirmed
Agreement
 HARQ procedures for transmission in preconfigured UL resources should be studied and the following aspects should be considered:
  Whether to support HARQ;
   If supported, details of HARQ design including the number of HARQ processes;
  Whether ACK/NACK is necessary
 Fallback mechanisms should be considered, e.g. fallback to legacy RACH/EDT procedures.
As described in the 3GPP RAN1#94bis Chairman's Note, the following agreements were made by RAN1.
Agreement
 Dedicated preconfigured UL resource is defined as an PUSCH resource used by a single UE
  PUSCH resource is time-frequency resource
  Dedicated PUR is contention-free
Agreement
 In IDLE mode, HARQ is supported for transmission in dedicated PUR
  A single HARQ process is supported,
   FFS whether more than one HARQ processes are supported
  FFS: The design of the corresponding MPDCCH search space
Agreement
 For UL transmission in preconfigured resource, fallback mechanism to RACH/EDT procedures is supported.
Agreement
 For transmission in preconfigured UL resources, an RRC idle UE may use the latest TA that passed the validation criteria
Agreement
 Pre-configured UL resources for transmission of data are indicated by RRC signaling. At least UE-specific RRC signaling is supported.
Agreement
 The resource configuration includes at least the following
  Time domain resources including periodicity(s)
  Frequency domain resources
  TBS(s)/MCS(s)
Agreement
 Dedicated preconfigured UL resource is defined as an NPUSCH resource used by a single UE
  NPUSCH resource is time-frequency resource
  Dedicated PUR is contention-free As described in the 3GPP RAN1#95 Chairman's Note, the following agreements were made by RAN1.
Additional MTC Enhancements
Agreement
 For dedicated PUR in idle mode, the UE may skip UL transmissions.
  FFS: Resource release mechanism
  FFS: Whether or not to support mechanism to disable skipping by eNB
Agreement
 If multi-TB grant is not enabled, a dedicated PUR allocation is associated to only a single TB and single HARQ process
  FFS: if multi-TB grant is enabled/supported
Agreement
 In idle mode, at least the following TA validation attributes are supported:
  Serving cell changes (serving cell refers the cell that the UE is camping on)
  Time Alignment Timer for idle mode
  Serving cell RSRP changes (serving cell refers the cell that the UE is camping on)
   Based on RSRP measurement definition in existing Rel-15 TS36.214
Agreement
 The UE can be configured to use at least these TA validation attributes:
  Time Alignment Timer for idle mode
  Serving cell RSRP changes
  Note: the configuration shall support disabling of the TA validation attributes
Agreement
 RAN1 assumes that a UE transitioning from EDT/connected to idle mode can use the valid TA that was used while in EDT/connected mode.
Agreement
 For dedicated PUR in idle mode, UL grant for HARQ retransmission is transmitted in MPDCCH search space
  FFS: Details on the search space (for example USS, CSS)
Agreement
 For dedicated PUR in idle mode, upon successful decoding by eNB of a PUR transmission, the UE can expect an explicit ACK
  FFS: if ACK is sent on MPDCCH (layer 1) and/or PDSCH (layer 2/3)
Agreement
 For dedicated PUR in idle mode, upon unsuccessful decoding by eNB of a PUR transmission, the UE can expect an UL GRANT for retransmission on the MPDCCH, or
FFS: a NACK, or
FFS: no explicit ACK Additional Enhancements for NB-IoT Agreement In idle mode, at least the following TA validation attributes are supported:
  Serving cell changes (serving cell refers the cell that the UE is camping on)
  Time Alignment Timer for idle mode
  Serving cell NRSRP changes (serving cell refers the cell that the UE is camping on)
    Based on NRSRP measurement definition in existing Rel-15 TS36.214

Agreement

The UE can be configured to use at least these TA validation attributes:
  Time Alignment Timer for idle mode
  Serving cell NRSRP changes
  Note: the configuration shall support disabling of the TA validation attributes Agreement RAN1 assumes that a UE transitioning from EDT/connected to idle mode can use the valid TA that was used while in EDT/connected mode.

Agreement

For dedicated PUR in idle mode, the UE may skip UL transmissions.
  FFS: Resource release mechanism
  FFS: Whether or not to support mechanism to disable skipping by eNB Agreement In idle mode, only one HARQ process is supported for dedicated PUR Agreement For dedicated PUR in idle mode, UL grant for HARQ retransmission is transmitted in search space
  FFS: Details on the search space (for example USS, CSS)

In the following paragraphs, "MTC UEs" could include "Bandwidth reduced and Low complexity UEs (BL UEs)" and/or "UEs in enhanced coverage (UEs in EC, UEs in CE)".

In LTE Release 15, in order to improve transmission efficiency and reduce power consumption for MTC (Machine-Type Communication) UEs and NB-IoT (Narrow Band Internet of Things) UEs, Early Data Transmission (EDT) is introduced. EDT could be applicable for MTC UEs and NB-IoT UEs. EDT could be triggered in RRC_IDLE state. After EDT is triggered, the UL user data (e.g. Mobile Originated data) is included in Msg3 during a Random Access procedure, and NW may include DL user data in Msg4 during the Random Access procedure. One benefit of EDT is that UL user data could be transmitted without the need of entering RRC_CONNECTED state. It is also possible that EDT fallbacks to legacy RRC connection establishment or resume procedure, and the UL user data may be transmitted after UE enters RRC_CONNECTED state.

There are two types of EDT:
  CP-EDT (EDT for Control Plane CIoT EPS optimizations)
    UL user data is transmitted in a NAS message concatenated in UL RRCEarlyDataRequest message on CCCH. RRCEarlyDataRequest is included in Msg3 during a Random Access procedure.
    DL user data may be optionally transmitted in a NAS message concatenated in DL RRCEarlyDataComplete message on CCCH. RRCEarlyDataComplete is included in Msg4 during the Random Access procedure.
    If the MME or the eNB decides to move the UE to RRC_CONNECTED mode, RRCConnectionSetup message is sent in Msg4 to fall back to the legacy RRC Connection establishment procedure.
  UP-EDT (EDT for User Plane CIoT EPS optimizations)
    UL user data is transmitted on DTCH multiplexed with UL RRCConnectionResumeRequest message on CCCH. In this case, both DTCH SDU and CCCH SDU are included in Msg3 during a Random Access procedure.
    DL user data may be optionally transmitted on DTCH multiplexed with DL RRCConnectionRelease message on DCCH. In this case, both DTCH SDU and DCCH SDU are included in Msg4 during the Random Access procedure.
    If the MME or eNB decides to move the UE to RRC_CONNECTED mode, RRCConnectionResume message (and optionally DL user data) is sent in Msg4 to fall back to the RRC Connection resume procedure.

In LTE Release 16, in order to further improve transmission efficiency and reduce power consumption for MTC UEs and NB-IoT UEs, transmission(s) in preconfigured UL resources (PUR) will be introduced and is currently under discussion. According to RAN1 agreements, UE could use dedicated (i.e. not shared among multiple UEs) PUR in RRC_IDLE state if some criteria are met. The criteria at least include valid Time Alignment (TA). The validation mechanism for TA is still under discussion, and an example may be a TA Timer for idle mode. The UE may consider its TA valid if the TA Timer is running. HARQ (Hybrid Automatic Repeat Request) is supported for transmission(s) using dedicated PUR to improve reliability, but the details are still under discussion. In addition, fallback mechanism to RACH (Random Access Channel)/EDT procedures is also supported, but the details are still under discussion.

In the following paragraphs, "UEs" could include MTC UEs and/or NB-IoT UEs. It is still unclear how transmission(s) using PUR is modeled in UE side. The configuration of PUR may be provided in a dedicated signaling to the UE when the UE is in RRC connected mode (or RRC_CONNECTED). The configured PUR may be valid when the UE is in RRC idle mode (or RRC_IDLE). The configured PUR may not require lower layer activation. The UE may not use the configured PUR if no data is available for transmission.

For dedicated PUR, because NW can identify which UE is performing a transmission using PUR, contention resolution is not needed. It may comprise two steps. The first step is the transmission using PUR, and the second step is reception of NW response. The NW response could be an acknowledgement of whether the transmission has been received successfully, e.g. HARQ feedback or an indication in a paging message. The NW (Network) response could be dynamic UL grant for retransmission. The NW response could be DL (Downlink) user data and/or RRC (Radio Resource Control) message, e.g. RRCEarlyDataComplete message. The DL user data and/or RRC message could be scheduled by a dynamic DL assignment. The dynamic DL assignment could be addressed to a specific RNTI (e.g. C-RNTI (of the UE when the UE was last time in RRC_CONNECTED), Temporary C-RNTI, or a new RNTI). The specific RNTI could be provided in the dedicated PUR configuration. The specific RNTI could be provided when UE is in RRC_CONNECTED state. The DL user data and/or RRC message could be scheduled by a paging message dedicated for the UE. The DL user data and/or RRC message could be carried in a paging message (dedicated) for the UE. If retransmission is required, the UE may perform retransmission in the next PUR occasion or based on dynamic UL grant received in the second step (in case dynamic UL grant in RRC_IDLE is supported).

NW may configure a UE with different sets of PUR configurations e.g. in order to facilitate different radio conditions in the same Serving Cell. For example, each set of PUR configuration is configured per enhanced coverage level (EC level). A PUR attempt may be that the UE transmits a MAC PDU on a PUR occasion. The PUR occasion may be pre-configured in PUR configuration or be provided in a dynamic UL grant. The UE may consider one PUR attempt fails if a dynamic UL grant for retransmission is received in response to the PUR attempt. The UE may consider one PUR attempt fails if nothing is received within a time period in response to the PUR attempt.

A UE should be provided with at least a (set of) PUR configuration before it performs a transmission using PUR. A (set of) PUR configuration may include at least one of the following parameters: transport block size(s) (TB size), Modulation and Coding scheme(s) (MCS), time domain periodicity in units of (e.g. hours, seconds, HFNs (Hyper Frame Numbers), SFNs (Subframe Numbers), subframes, slots, or symbols), time domain offset in units of (e.g. hours, seconds, HFNs (Hyper Frame Numbers), SFNs (Subframe Numbers), subframes, slots, or symbols), frequency domain location or offset, threshold (e.g. RSRP (Reference Signal Received Power) threshold), (maximum) number of repetitions for each attempt of the transmission using PUR, transmission power (Tx power) for each attempt of the transmission using PUR, and/or power ramping step. Some of the aforementioned parameters may have different values for different sets of PUR configurations. Some of the aforementioned parameters may not be included in the sets of PUR configurations and are shared between multiple sets of PUR configurations. For example, the time domain periodicity may be shared. As another example, the (maximum) number of repetitions may not be shared. As a further example, the TB size(s) may be shared. As an additional example, the Tx power may not be shared.

Different Enhanced Coverage levels (EC level) may be defined to facilitate different radio conditions. The UE may determine the current EC level by comparing the current measured RSRP with the RSRP threshold for each EC level.

In order to perform successful transmission using PUR in RRC_IDLE state, the UE should maintain a valid timing adjustment (or timing alignment, TA), e.g. $N_{TA}$ as discussed in 3GPP TS 36.213. TA may be used to adjust the uplink (UL) transmission timing of the UE so as to compensate for propagation delay between the UE and the Serving Cell. The validity of TA may be controlled by a TA timer (e.g. timeAlignmentTimer as discussed in 3GPP TS 36.321) and/or by radio condition. The UE may validate the TA based on TA-related configuration for PUR received from the NW.

Currently, the maximum length of TA timer (excluding infinity value) is 10.24 seconds. If NW configures the UE with such length for transmission using PUR, it cannot support transmission using PUR with periodicity longer than 10.24 s. For example, the periodicity of PUR could be 1 hour, and the TA timer length could be 10.24 s. The UE restarts the TA timer upon entering RRC_IDLE.

In most cases, the TA timer will expire before the next PUR occasion occurs. Even if the TA timer is still running upon the first PUR occasion, the timer will indeed expire before the next PUR occasion. This implies that UE may never be able to perform transmission using PUR because the TA timer is not running, unless the NW configures the periodicity of PUR shorter than the length of the TA timer. If the NW configures a short periodicity of PUR to the UE, it may also result in waste of UL resources if there is no data traffic at most time in RRC_IDLE state.

To solve such issue (considering that the length of TA timer used in RRC_CONNECTED state (e.g. the legacy TA timer, which is timeAlignmentTimer as discussed in 3GPP TS 36.321) should not be impacted), the UE could apply different length for the TA timer in RRC_IDLE state (e.g. new TA timer (also in MAC layer)). In other words, the length of the TA timer (e.g. new TA timer) used to control validity of TA for transmission using PUR in RRC_IDLE could be different from the length of the TA timer (e.g. the legacy TA timer) used to control validity of TA for transmission in RRC_CONNECTED (including the RA procedure for entering RRC_CONNECTED).

In the following paragraphs, the length of the TA timer used to control validity of TA for transmission using PUR in RRC_IDLE could be referred to as "the first length". Furthermore, in the following paragraphs, the length of the TA timer used to control validity of TA for transmission in RRC_CONNECTED (including the RA procedure in RRC_IDLE) could be referred to as "the second length". The second length could be indicated by a configuration of timeAlignmentTimerCommon. The second length could be indicated by a configuration of timeAlignmentTimerDedicated.

The first length and the second length could be for the same Serving Cell. The UE could store or maintain both the first length and the second length, and could apply one of them upon starting or restarting the TA timer (the legacy TA timer or the new TA timer).

The first length could be included in the configuration for PUR, in the TA-related configuration for PUR, or in the system information, e.g. a dedicated SIB for PUR. The first length could be in units of e.g. seconds, minutes, hours, or hyper frame numbers (HFN). The length of the TA timer for transmission using PUR could be in units of the periodicity of the associated PUR, e.g. 2.

The first length could be a multiple of (the second length configured by) timeAlignmentTimerCommon, and the multiple could be predefined (e.g. 10×) or configured. The first length could be a multiple of (the second length configured by) timeAlignmentTimerDedicated, and the multiple could be predefined (e.g. 10×) or configured. The UE could apply the first length by multiplying (the second length configured by) the timeAlignmentTimerCommon or the timeAlignmentTimerDedicated with the multiple when entering RRC_IDLE state.

The multiple could be included in the configuration for PUR. The multiple could be included in the TA-related configuration for PUR. The timeAlignmentTimerCommon could be included in SystemInformationBlockType2 and/or in SystemInformationBlockType2-NB. The timeAlignmentTimerDedicated could be included MAC-MainConfig. The timeAlignmentTimerDedicated and/or MAC-MainConfig could be included in a RRCConnectionReconfiguration message, as discussed in 3GPP TS 36.331.

The NW could provide a first length to the UE, wherein the first length is different from timeAlignmentTimerCommon in the SIB2 or timeAlignmentTimerDedicated in the MAC-MainConfig. The NW could provide the first length to the UE in the RRCConnectionRelease message or in the NW response for PUR. The NW could include the first length in the configuration for PUR, in the TA-related configuration, or in the system information, e.g. a dedicated SIB for PUR.

If the NW does not provide the first length to the UE in the RRCConnectionRelease message, the UE could apply the second length (e.g. timeAlignmentTimerDedicated) as the first length. If the NW does not provide the first length to the UE, the UE could apply the second length (e.g. timeAlignmentTimerCommon) as the first length.

Figure 18:
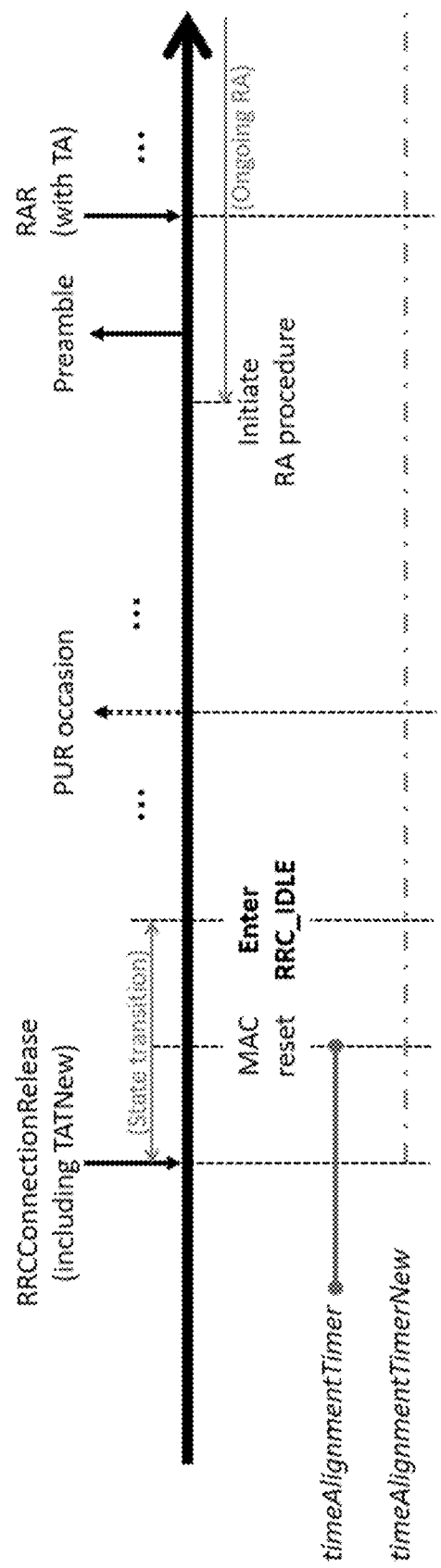
FIG. 18 is a diagram according to one exemplary embodiment.

Operations of the TA timer (e.g. new TA timer) used to control validity of TA for transmission using PUR in RRC_IDLE still need to be designed. FIG. 18 is an example of introducing a new TA timer for PUR in RRC_IDLE state. It is unclear when to start, restart, and/or stop the new TA timer.

Figure 19:
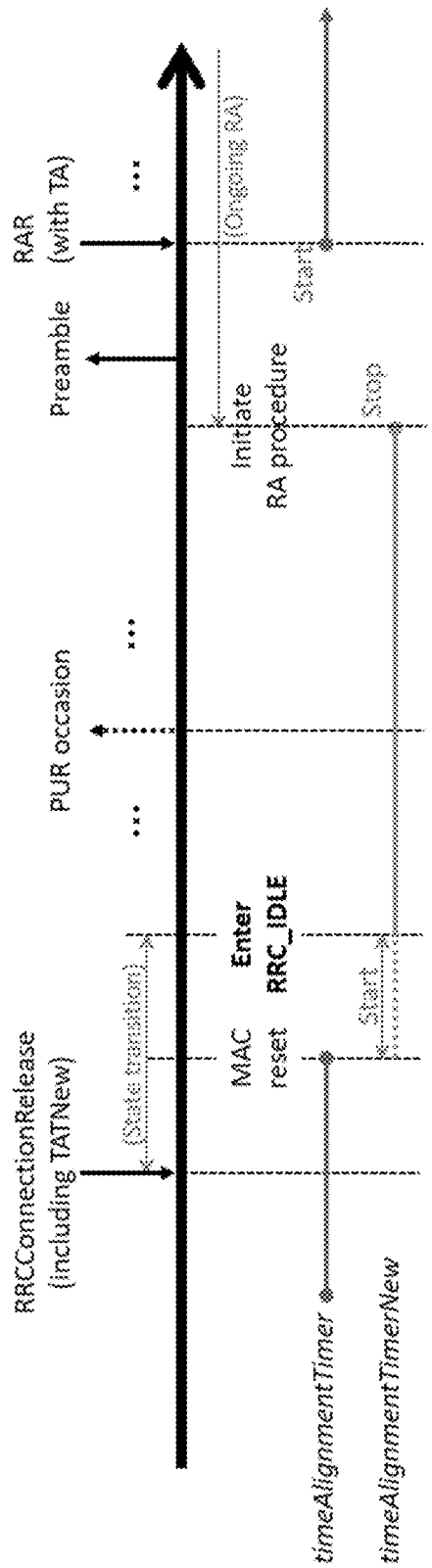
FIG. 19 is a diagram according to one exemplary embodiment.

The UE could start (or restart) the TA timer (e.g. the new TA timer) (by applying the first length) during state transition from RRC_CONNECTED to RRC_IDLE (e.g. during a RRC connection release procedure initiated by reception of a RRCConnectionRelease message). FIG. 19 shows an example of timing to start the TA timer (e.g. the new TA timer). For example, during state transition from RRC_CONNECTED to RRC_IDLE (e.g. during a RRC connection release procedure), the UE could start the TA timer (e.g. the new TA timer) in response to (or when) applying the first length. Alternatively, during state transition from RRC_CONNECTED to RRC_IDLE, the UE could restart the TA timer (e.g. the new TA timer) in response to (or when) applying the first length.

(During state transition from RRC_CONNECTED to RRC_IDLE,) the UE could start or restart the TA timer (e.g. the new TA timer) upon (or when) entering RRC_IDLE state. Entering the RRC_IDLE state could be triggered by reception of the RRCConnectionRelease message. For example, if the UE starts or restarts the TA timer (e.g. the new TA timer) upon entering RRC_IDLE state, the UE applies the first length. In other words, the UE starts or restarts the TA timer (e.g. the new TA timer) by applying the first length upon entering RRC_IDLE state.

The UE could determine whether to (re-)start the new TA timer (by applying the first length) or the legacy TA timer (by applying the second length) based on whether there is an ongoing RA procedure, e.g. when the UE receives a Timing Advance Command in RRC_IDLE state. For example, if the UE starts or restarts the TA timer (e.g. the new TA timer) in RRC_IDLE state while there is no ongoing RA procedure, the UE applies the first length. As another example, if the UE starts or restarts the TA timer (e.g. the legacy TA timer) in RRC_IDLE state while there is ongoing RA procedure, the UE applies the second length. In other words, the UE starts or restarts the TA timer (e.g. the legacy TA timer) by applying the second length while a RA procedure is ongoing. For example, if the UE starts or restarts the TA timer (e.g. the legacy TA timer) in RRC_CONNECTED state, the UE applies the second length.

When the first length is configured, the UE could start (if the timer is not running) the TA timer (e.g. the new TA timer) while in RRC_CONNECTED state. When the first length is reconfigured, the UE could start (if the timer is not running) the TA timer (e.g. the new TA timer) while in RRC_IDLE state. When the first length is reconfigured, the UE could restart (if the timer is already running) the TA timer (e.g. the new TA timer) while in RRC_IDLE state.

The UE could start or restart the TA timer (e.g. the legacy TA timer or the new TA timer) when a Timing Advance Command is received. The UE could determine whether to (re)start the legacy TA timer or the new TA timer based on whether the Timing Advance Command is received in a Random Access Response message or not.

For example, the UE (re)starts the legacy TA timer (and not (re)start the new TA timer) if the Timing Advance Command is received in a Random Access Response message. As another example, the UE (re)starts the new TA timer (and not (re)start the legacy TA timer) if the Timing Advance Command is received in a Timing Advance Command MAC control element when the UE is in RRC_IDLE. As another example, the UE (re)starts the legacy TA timer (and not (re)start the new TA timer) if the Timing Advance Command is received in a Timing Advance Command MAC control element when the UE is in RRC_CONNECTED.

The UE could start or restart the TA timer (e.g. the new TA timer) upon entering RRC_IDLE state, e.g. in case there is no additional length defined for the TA timer (e.g. the new TA timer) (i.e. only timeAlignmentTimerCommon and timeAlignmentTimerDedicated exist).

In 3GPP TS 36.331, the UE would perform a MAC reset in response to reception of a RRCConnectionRelease message. Alternatively, after receiving an RRCConnectionRelease message while in RRC_CONNECTED state (i.e. the UE will enter RRC_IDLE state in the near future), the UE could determine whether the MAC reset (during a RRC connection release procedure initiated by the RRCConnectionRelease message) is performed or not based on one or some of the following conditions:

If the UE has a configuration for PUR, the UE does not perform MAC reset.
If the UE has a configuration for PUR, the UE performs MAC reset.
If the UE has a configuration for PUR, the UE performs a new type of MAC reset.
If the UE does not have a configuration for PUR, the UE performs MAC reset.
If the UE has a TA-related configuration for PUR, the UE does not perform MAC reset.
If the UE has a TA-related configuration for PUR, the UE performs MAC reset.
If the UE has a TA-related configuration for PUR, the UE performs a new type of MAC reset.
If the UE does not have a TA-related configuration for PUR, the UE performs MAC reset.
If the received RRCConnectionRelease message contains a configuration for PUR, the UE does not perform MAC reset.
If the received RRCConnectionRelease message contains a configuration for PUR, the UE performs MAC reset.
If the received RRCConnectionRelease message contains a configuration for PUR, the UE performs a new type of MAC reset.
If the received RRCConnectionRelease message does not contain a configuration for PUR, the UE performs MAC reset.
If the received RRCConnectionRelease message contains a TA-related configuration for PUR, the UE does not perform MAC reset.
If the received RRCConnectionRelease message contains a TA-related configuration for PUR, the UE performs MAC reset.
If the received RRCConnectionRelease message contains a TA-related configuration for PUR, the UE performs a new type of MAC reset.
If the received RRCConnectionRelease message does not contain a TA-related configuration for PUR, the UE performs MAC reset.

In RRC_CONNECTED state, the UE considers the TA valid for a Serving Cell when a timeAlignmentTimer (e.g. the legacy TA timer discussed 3GPP TS 36.321) associated with the Serving Cell is still running. If the timeAlignmentTimer expires or is considered as expired, the UE considers the TA invalid and cannot perform any UL transmission except for the transmission of a Random Access Preamble. The NW is responsible for keeping the timeAlignmentTimer running if there is data traffic between the UE and the NW.

It is still unclear how the UE determines the validity of TA (for transmission using PUR in RRC_IDLE) when the UE is in RRC_IDLE state. RRC_IDLE state is different from RRC_CONNECTED state that there is nearly no interaction between the UE and the NW. It is difficult for the NW to determine whether the TA maintained by the UE is still valid or not, and there could be different means for the UE to determine the validity of TA in RRC_IDLE state.

In response to the occurrence of one or some of the following events (each event may be independent from each other), whether the UE considers the TA (for transmission using PUR in RRC_IDLE) valid or invalid should be considered:

1. NW Response for PUR is Received

The NW response for PUR could be in response to (re-)transmission using PUR. The NW response for PUR could be in response to retransmission scheduled by a dynamic UL grant for PUR.

The UE may consider the TA (for transmission using PUR in RRC_IDLE) valid or invalid based on whether the transmission using PUR is successful or not. After receiving the NW response, the UE could determine whether the transmission using PUR is successful or not. Additionally or alternatively, the UE may consider the TA valid or invalid based on the content of the NW response.

For example, if the transmission using PUR is successful, the UE considers the TA still valid, and if the transmission using PUR is not successful, the UE considers the TA invalid. Alternatively, after receiving the NW response, the UE considers the TA still valid regardless of whether the transmission using PUR is successful or not. For example, the UE could consider the transmission using PUR successful if a NW response indicating "ACK" is received. The UE could consider the transmission using PUR not successful if a NW response indicating "NACK" is received. The NW response could be a downlink control information (DCI). The NW response could be a MAC control element. The NW response could be an RRC message.

As another example, if the NW response contains TA-related configuration (for PUR), the UE considers the TA still valid and updates the TA-related configuration. For example, if the NW response contains configuration for PUR, the UE considers the TA still valid. For example, if EDT is triggered and the NW response contains an RRCEarlyDataComplete message, the UE could consider the TA still valid and keeps the TA-related configuration (for PUR). For example, if EDT is triggered and the NW response contains an RRCConnectionRelease message, the UE could consider the TA still valid and keeps the TA-related configuration (for PUR).

For example, if the NW response contains an RRCConnectionReject message, the UE could consider the TA invalid and releases the TA-related configuration (for PUR). Alternatively, if the NW response contains an RRCConnectionReject message, the UE could consider the TA invalid and keeps the TA-related configuration (for PUR). Alternatively, if the NW response contains an RRCConnectionReject message, the UE could consider the TA valid and keeps the TA-related configuration (for PUR).

For example, if the UE does not receive the NW response for PUR during a time period, the UE could consider the TA invalid. In addition, if the UE does not receive the NW response for PUR during a time period, the UE could release the TA-related configuration (for PUR).

For example, the UE could consider the TA still valid if the NW response indicates that the TA is still valid, and could consider the TA invalid if the NW response indicates that the TA is invalid.

In case CP-EDT is initiated, after receiving an RRCEarlyDataComplete message (i.e. the CP-EDT is successfully completed), the UE could determine whether a MAC (Medium Access Control) reset is performed or not based on one or some of the following conditions:

If the UE transmitted the RRCEarlyDataRequest message using PUR, the UE may not perform MAC reset.
If the UE transmitted the RRCEarlyDataRequest message using PUR, the UE could perform a new type of MAC reset.
If the UE transmitted the RRCEarlyDataRequest message not using PUR, the UE could performsMAC reset.
If the UE has a configuration for PUR, the UE may not perform MAC reset.
If the UE has a configuration for PUR, the UE could perform MAC reset.
If the UE has a configuration for PUR, the UE could perform a new type of MAC reset.
If the UE does not have a configuration for PUR, the UE could perform MAC reset.
If the UE has a TA-related configuration for PUR, the UE may not perform MAC reset.
If the UE has a TA-related configuration for PUR, the UE could perform MAC reset.
If the UE has a TA-related configuration for PUR, the UE could perform a new type of MAC reset.
If the UE does not have a TA-related configuration for PUR, the UE could perform MAC reset.
If the received RRCEarlyDataComplete message contains a configuration for PUR, the UE may not perform MAC reset.
If the received RRCEarlyDataComplete message contains a configuration for PUR, the UE could perform MAC reset.
If the received RRCEarlyDataComplete message contains a configuration for PUR, the UE could perform a new type of MAC reset.
If the received RRCEarlyDataComplete message does not contain a configuration for PUR, the UE could perform MAC reset.
If the received RRCEarlyDataComplete message contains a TA-related configuration for PUR, the UE may not perform MAC reset.
If the received RRCEarlyDataComplete message contains a TA-related configuration for PUR, the UE could perform MAC reset.
If the received RRCEarlyDataComplete message contains a TA-related configuration for PUR, the UE could perform a new type of MAC reset.
If the received RRCEarlyDataComplete message does not contain a TA-related configuration for PUR, the UE could perform MAC reset.

In case UP-EDT is initiated, after receiving an RRCConnectionRelease message (i.e. the UP-EDT is successfully completed), the UE could determine whether a MAC reset is performed or not based on one or some of the following conditions:

If the UE transmitted the RRCConnectionResumeRequest message using PUR, the UE may not perform MAC reset.

If the UE transmitted the RRCConnectionResumeRequest message using PUR, the UE could perform a new type of MAC reset.

If the UE transmitted the RRCConnectionResumeRequest message not using PUR, the UE could perform MAC reset.

If the UE has a configuration for PUR, the UE may not perform MAC reset.

If the UE has a configuration for PUR, the UE could perform MAC reset.

If the UE has a configuration for PUR, the UE could perform a new type of MAC reset.

If the UE does not have a configuration for PUR, the UE could perform MAC reset.

If the UE has a TA-related configuration for PUR, the UE may not perform MAC reset.

If the UE has a TA-related configuration for PUR, the UE could perform MAC reset.

If the UE has a TA-related configuration for PUR, the UE could perform a new type of MAC reset.

If the UE does not have a TA-related configuration for PUR, the UE could perform MAC reset.

If the received RRCConnectionRelease message contains a configuration for PUR, the UE may not perform MAC reset.

If the received RRCConnectionRelease message contains a configuration for PUR, the UE could perform MAC reset.

If the received RRCConnectionRelease message contains a configuration for PUR, the UE could perform a new type of MAC reset.

If the received RRCConnectionRelease message does not contain a configuration for PUR, the UE could perform MAC reset.

If the received RRCConnectionRelease message contains a TA-related configuration for PUR, the UE may not perform MAC reset.

If the received RRCConnectionRelease message contains a TA-related configuration for PUR, the UE could perform MAC reset.

If the received RRCConnectionRelease message contains a TA-related configuration for PUR, the UE could perform a new type of MAC reset.

If the received RRCConnectionRelease message does not contain a TA-related configuration for PUR, the UE could perform MAC reset.

In case no EDT is initiated, after receiving an RRCConnectionReject message (i.e. the connection establishment procedure or the connection resume procedure fails), the UE could determine whether a MAC reset is performed or not based on one or some of the following conditions:

If the UE transmitted the RRCConnectionRequest message or the RRCConnectionResumeRequest message using PUR, the UE may not perform MAC reset.

If the UE transmitted the RRCConnectionRequest message or the RRCConnectionResumeRequest message using PUR, the UE could perform a new type of MAC reset.

If the UE transmitted the RRCConnectionRequest message or the RRCConnectionResumeRequest message not using PUR, the UE could perform MAC reset.

If the UE has a configuration for PUR, the UE may not perform MAC reset.

If the UE has a configuration for PUR, the UE could perform MAC reset.

If the UE has a configuration for PUR, the UE could perform a new type of MAC reset.

If the UE does not have a configuration for PUR, the UE could perform MAC reset.

If the UE has a TA-related configuration for PUR, the UE may not perform MAC reset.

If the UE has a TA-related configuration for PUR, the UE could perform MAC reset.

If the UE has a TA-related configuration for PUR, the UE could perform a new type of MAC reset.

If the UE does not have a TA-related configuration for PUR, the UE could perform MAC reset.

If the received RRCConnectionReject message contains a configuration for PUR, the UE may not perform MAC reset.

If the received RRCConnectionReject message contains a configuration for PUR, the UE could perform MAC reset.

If the received RRCConnectionReject message contains a configuration for PUR, the UE could perform a new type of MAC reset.

If the received RRCConnectionReject message does not contain a configuration for PUR, the UE could perform MAC reset.

If the received RRCConnectionReject message contains a TA-related configuration for PUR, the UE may not perform MAC reset.

If the received RRCConnectionReject message contains a TA-related configuration for PUR, the UE could perform MAC reset.

If the received RRCConnectionReject message contains a TA-related configuration for PUR, the UE could perform a new type of MAC reset.

If the received RRCConnectionReject message does not contain a TA-related configuration for PUR, the UE could perform MAC reset.

In the above examples, "keeping the TA-related configuration" could imply that the UE does not release the TA-related configuration (for PUR) even if a MAC reset is performed.

2. RA Procedure is Initiated (in RRC_IDLE) while the TA (for Transmission Using PUR in RRC_IDLE) is Valid (e.g. TA Timer (e.g. the New TA Timer) is Running)

It is possible that while TA is valid, the UE cannot use PUR because another condition(s) for using PUR is not met. It is also possible that a PDCCH (Physical Downlink Control Channel) order is received e.g. in response to transmission using PUR while the TA is valid. As the result, the UE will initiate a RA procedure (in RRC_IDLE). The UE may consider the TA as invalid in response to (or when) initiation of the RA procedure, e.g. in order not to use the TA for the RA procedure. FIG. 19 shows an example of timing to stop the TA timer (e.g. the new TA timer).

For example, the UE could consider the TA invalid when a RA procedure for EDT is initiated not due to reception of the PDCCH order. The UE could consider the TA invalid when a RA procedure not for EDT is initiated not due to reception of the PDCCH order. The UE could consider the TA invalid when a RA procedure is initiated due to reception of the PDCCH order while in RRC_IDLE state.

3. Reception of Paging-Related Signaling (e.g. PDCCH Addressed to P-RNTI, Paging Message, WUS, Group-Based WUS)

In RRC_IDLE state, the UE monitors paging occasions for receiving PDCCH addressed to P-RNTI and paging messages. Some paging messages may not contain UE-id related information. Some paging messages could contain UE-id related information. In addition, if wake-up signaling (WUS) is configured, the UE could monitor WUS occasions for receiving WUS. If group-based WUS is configured, the UE could monitor group-based WUS occasions for receiving group-based WUS. The UE may consider the TA (for transmission using PUR in RRC_IDLE) valid in response to reception of the paging-related signaling. The UE may consider the TA invalid in response to reception of the paging-related signaling. The UE may consider the TA valid based on an indication in the paging-related signaling. The UE may consider the TA invalid based on an indication in the paging-related signaling.

For example, the UE could consider the TA invalid in response to reception of a paging message containing UE-id related information for the UE. For example, the UE could consider the TA invalid in response to reception of a paging message indicating system information change.

For example, the UE could consider the TA invalid in response to reception of a paging message indicating that TA is invalid. The UE could consider the TA valid in response to reception of a paging message indicating that TA is valid. For example, the UE could consider the TA invalid in response to reception of the paging related signaling indicating release of configuration for PUR.

4. Indication in System Information (e.g. Support of PUR is Toggled)

Some of the parameters or information for PUR could be broadcasted in the system information (SI). The UE could acquire SI(s) e.g. upon re-selecting a Cell or upon receiving a notification that the system information has changed. The UE may consider the TA (for transmission using PUR in RRC_IDLE) valid in response to acquiring the SI(s). The UE may consider the TA invalid in response to acquiring the SI(s). The UE may consider the TA valid based on an indication in the acquired SI. The UE may consider the TA invalid based on an indication in the acquired SI.

For example, an indication is included in the SI(s). The indication could be included in SystemInformationBlockType1-BR and/or in SystemInformationBlockType1-NB. The indication could also be included in SystemInformationBlockType2 and/or in SystemInformationBlockType2-NB. Furthermore, the indication could be included in other SIB(s). The UE could consider the TA invalid if the indication indicates that the Serving Cell does not support PUR or the support of PUR is turned-off. The UE could consider the TA valid if the indication indicates that the Serving Cell supports PUR or the support of PUR is turned-on.

In addition, the indication could be per EC level. The UE in an EC level of the Serving Cell could consider the TA invalid if the indication indicates that the EC level does not support PUR or the support of PUR for the EC level is turned-off. The UE in an EC level of the Serving Cell could consider the TA valid if the indication indicates that the EC level supports PUR or the support of PUR for the EC level is turned-on.

In addition, the UE could periodically determine the current EC level based on measured RSRP in RRC_IDLE state. The UE could consider EC level changes in response to the periodical determination. The UE could trigger an UL transmission in response to EC level change in order to update the TA.

In the above conditions, the UE may keep the TA-related configuration when performing the MAC reset. In the above conditions, the UE may not stop the TA timer (e.g. the new TA timer) and may not consider the TA timer (e.g. the new TA timer) as expired when performing the MAC reset. In the above conditions, the UE may store the configuration for PUR before performing the MAC reset, and may apply the stored configuration for PUR after the MAC reset. In the above conditions, the UE may store the TA-related configuration (for PUR) before performing the MAC reset, and may apply the stored TA-related configuration after the MAC reset. In the above conditions, the UE may apply the received configuration for PUR after the MAC reset. In the above conditions, the UE may apply the received TA-related configuration after the MAC reset.

In the above conditions, the UE may restart the TA timer (e.g. the new TA timer) when performing the MAC reset. In the above conditions, the UE may (start or) restart the TA timer (e.g. the new TA timer) when performing the new type of MAC reset. In the above conditions, the UE may start the TA timer (e.g. the new TA timer) after performing the MAC reset.

Comparing to current MAC reset (as described in Section 5.9 of 3GPP TS 36.321), the new type of MAC reset could have at least one of the following differences:
  Not stop (if running) the TA timer;
  Not stop (if running) all timers;
  Not consider the TA timer as expired and not perform the corresponding actions upon the TA timer expiry.

The new type of MAC reset could have at least one of the following actions:
  flush all UL HARQ buffers;
  flush the soft buffers for all DL HARQ processes;
  flush Msg3 buffer;
  stop, if any, ongoing RACH procedure.

In the above paragraphs, the TA-related configuration for PUR could include at least one of the following:
  Timer length for the TA timer (e.g. the new TA timer) (e.g. a dedicated configuration)
  RSRP threshold(s) for the Serving Cell, e.g. for determining validity of TA for the Serving Cell
  RSRP threshold(s) for the neighboring Cell, e.g. for determining validity of TA for the Serving Cell
  Initial TA (an absolute value of $T_A$)
  This TA is independent from the current TA maintained by the UE. For example, the UE applies the TA by replacing the current TA with the received value, e.g. $N_{TA} = T_A \times 16$
  A value for adjusting the current TA (a relative value of $T_A$)
  This TA depends on the current TA maintained by the UE. For example, the UE applies the TA by updating the current TA with the received value, e.g. $N_{TA,new} = N_{TA,old} + (T_A - 31) \times 16$ The UE could receive the TA-related configuration in the RRCConnectionRelease message while in RRC_CONNECTED state. The UE could receive the TA-related configuration in the NW response for PUR while in RRC_IDLE state. The UE could receive the TA-related configuration in the Msg4 of a Random Access procedure for EDT. The UE could get an initial TA if it is included in the TA-related configuration. The UE could get an initial TA by reusing the TA in RRC_CONNECTED state if the initial TA is not included in the TA-related configuration. The UE could update the TA in response to receiving the TA-related configuration in RRC_IDLE. The UE could update the TA in response to receiving the Msg4 of a Random Access procedure for EDT. The UE could release the TA-related configuration in response to entering RRC_CONNECTED state from RRC_IDLE state.

The TA-related configuration could be included in a configuration for PUR. The TA-related configuration could be separate from a configuration for PUR. The configuration for PUR could at least include time/frequency resources for transmission using PUR.

The NW could control the TA validity (for transmission using PUR in RRC_IDLE) of the UE in RRC_IDLE by the above events. For example, in response to successful reception of UL data transmitted by a UE using PUR, if the NW decides to keep the TA (for transmission using PUR in RRC_IDLE) of the UE valid, the NW could use NW response to indicate the UE that TA is valid. For example, the NW could use paging including UE-ID related information to indicate the UE that TA is invalid.

In some of the aforementioned examples, the UE may start the TA timer (e.g. the new TA timer) in response to considering the TA valid. In some of the aforementioned examples, the UE may restart the TA timer (e.g. the new TA timer) in response to considering the TA valid. In some of the aforementioned examples, the UE may stop the TA timer (e.g. the new TA timer) in response to considering the TA invalid. In other words, the UE considers the TA (for transmission using PUR in RRC_IDLE) as invalid by stopping the TA timer (e.g. the new TA timer).

In some of the aforementioned examples, the UE may suspend the TA timer (e.g. the new TA timer) in response to considering the TA invalid. In some of the aforementioned examples, the UE may resume the TA timer (e.g. the new TA timer) in response to considering the TA valid. In some of the aforementioned examples, the UE may take no action on the TA timer (e.g. the new TA timer) in response to considering the TA valid. In some of the aforementioned examples, the UE may take no action on the TA timer (e.g. the new TA timer) in response to considering the TA invalid. In some of the aforementioned examples, the UE may consider the TA timer (e.g. the new TA timer) as expired in response to considering the TA invalid and then perform the corresponding actions upon TA timer expiry. In other words, the UE considers the TA (for transmission using PUR in RRC_IDLE) as invalid by considering the TA timer (e.g. the new TA timer) as expired. In some of the aforementioned examples, the UE may not flush the HARQ buffer in response to considering the TA invalid.

Stop of the TA timer could mean that the timer stops running but the UE does not consider the timer as expired. Taking no action on the TA timer could mean that the timer continues running if it was running or continues not running if it was not running. Suspension of the TA timer could mean that the timer stops running and keeps the timer value at the time the timer is suspended. Resumption of the TA timer means that the timer starts to run from the timer value at the time the timer was suspended.

For example, if the UE considers the TA valid due to the transmission using PUR successful, the UE could restart the TA timer (e.g. the new TA timer). Alternatively, if the UE considers the TA valid due to the transmission using PUR successful, the UE could take no action on the TA timer (e.g. the new TA timer). For example, if the UE considers the TA invalid due to not receiving the NW response for PUR during a time period, the UE could stop the TA timer (e.g. the new TA timer). Alternatively, if the UE considers the TA invalid due to not receiving the NW response for PUR during a time period, the UE could consider the TA timer (e.g. the new TA timer) as expired. For example, if the UE updates (or applies) the TA-related configuration (for PUR), the UE could start or restart the TA timer (e.g. the new TA timer). For example, if the UE considers the TA invalid due to the NW response containing an RRCConnectionReject message, the UE could stop the TA timer (e.g. the new TA timer). For example, if the UE considers the TA invalid due to initiation of a RA procedure (e.g. due to reception of the PDCCH order), the UE could stop the TA timer (e.g. the new TA timer). For example, if the UE enters RRC_IDLE state from RRC_CONNECTED state due to reception of an RRCConnectionReject (or RRCConnectionRelease or RRCEarlyDataComplete) message and the message contains TA-related configuration (for PUR), the UE could start or restart the TA timer (e.g. the new TA timer). For example, if the NW response contains TA-related configuration (for PUR), the UE could start or restart the TA timer (e.g. the new TA timer). For example, if the UE updates the TA-related configuration (for PUR), the UE could start or restart the TA timer (e.g. the new TA timer). For example, if the UE releases the TA-related configuration (for PUR), the UE could stop the TA timer (e.g. the new TA timer).

In addition, if the TA (for transmission using PUR in RRC_IDLE) becomes valid while a RA procedure is ongoing, the UE may abort the RA procedure and perform transmission using PUR. For example, after the UE receives a RA response during the RA procedure, the UE could apply TA Command included in the RA response and starts the TA timer (e.g. the new TA timer) and aborts the ongoing RA procedure.

In addition, during state transition from RRC_IDLE to RRC_CONNECTED (i.e. the RA procedure is initiated in RRC_IDLE state), when a RA response is received, the UE could start the TA timer (e.g. the legacy TA timer) with a timer length (e.g. the second length) different from the timer length used in RRC_IDLE state (e.g. the first length).

Whether the TA for transmission using PUR in RRC_IDLE is valid or not could be based on whether the corresponding TA timer (e.g. the new TA timer) is running or not.

In some of the aforementioned examples, when the UE considers the TA valid, if the TA is already valid (i.e. the TA does not become valid from invalid), the UE may not take the actions related to the TA timer as described in those examples. In some of the aforementioned examples, when the UE considers the TA invalid, if the TA is already invalid (i.e. the TA does not become invalid from valid), the UE may not take the actions related to the TA timer as described in those examples.

In the above paragraphs, "consider the TA valid" could mean that the TA becomes valid from invalid. In the above paragraphs, "consider the TA invalid" could mean that the TA becomes invalid from valid.

In the above paragraphs, the "RSRP" could be replaced with other radio condition related criterion, e.g. RSRQ, CSI-RS quality, SINR. In the above paragraphs, the "RSRP" could be replaced with positioning related criterion, e.g. TDOA.

In the above paragraphs, the UE may not change Serving Cell if the UE considers the TA invalid.

In the above paragraphs, the TA could be specific for a Serving Cell. Alternatively, the TA could be specific for Cells included in a list. In the above paragraphs, the TA timer could be specific for a Serving Cell. Alternatively, the TA timer could be specific for Cells included in a list. In the above paragraphs, the configuration for PUR could be specific for a Serving Cell. Alternatively, the configuration for PUR could be specific for Cells included in a list. In the above paragraphs, the TA-related configuration could be specific for a Serving Cell. Alternatively, the TA-related configuration is specific for Cells included in a list.

In the above paragraphs, the solutions or actions could be applicable to only contention-based PUR, only contention-free PUR, or both contention-based and contention-free PUR. In the above paragraphs, the UE could perform the solutions or actions in RRC_IDLE state or before entering RRC_CONNECTED state.

Figure 20:
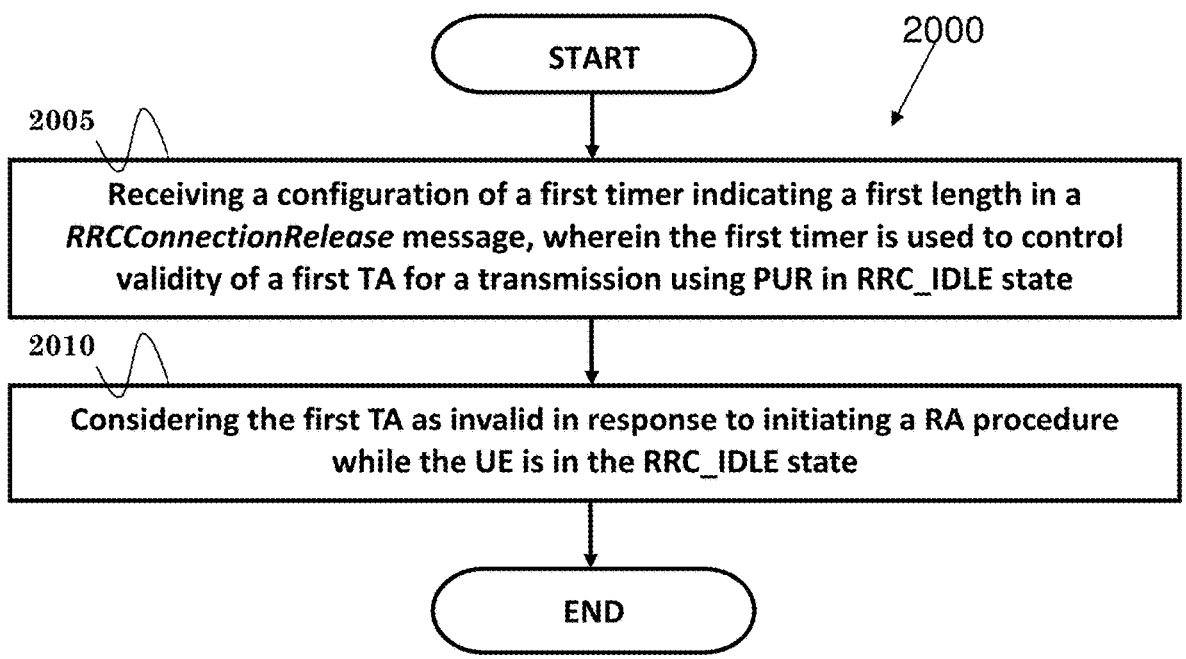
FIG. 20 is a flow chart according to one exemplary embodiment.

FIG. 20 is a flow chart 2000 according to one exemplary embodiment from the perspective of a UE. In step 2005, the UE receives a configuration of a first timer indicating a first length in a RRCConnectionRelease message, wherein the first timer is used to control validity of a first Timing Adjustment (TA) for a transmission using Preconfigured Uplink Resources (PUR) in RRC_IDLE state. In step 2010, the UE considers the first TA as invalid in response to initiating a Random Access (RA) procedure while the UE is in the RRC_IDLE state.

In one embodiment, the UE could consider the first TA as invalid by stopping the first timer or considering the first timer as expired.

In one embodiment, the UE could perform a MAC (Media Access Control) reset in response to reception of the RRC-ConnectionRelease message.

In one embodiment, the UE could start the first timer by applying the first length during a state transition from RRC_CONNECTED state to the RRC_IDLE state. During the state transition from the RRC_CONNECTED state to the RRC_IDLE state, the UE could start the first timer after the MAC reset or upon entering the RRC_IDLE state. In one embodiment, the UE may not stop the first timer when performing the MAC reset.

In one embodiment, the UE could receive a configuration of a second timer indicating a second length, wherein the second timer is used to control validity of a second TA for a transmission in the RRC_CONNECTED state. The UE could start the second timer, in the RRC_IDLE state, by applying the second length while a RA procedure is ongoing.

Referring back to FIGS. 3 and 4, in one exemplary embodiment of a UE, the device 300 includes a program code 312 stored in the memory 310. The CPU 308 could execute program code 312 to enable the UE (i) to receive a configuration of a first timer indicating a first length in a RRCConnectionRelease message, wherein the first timer is used to control validity of a first TA for a transmission using PUR in RRC_IDLE state, and (ii) to consider the first TA as invalid in response to initiating a RA procedure while the UE is in the RRC_IDLE state. Furthermore, the CPU 308 can execute the program code 312 to perform all of the above-described actions and steps or others described herein.

Figure 21:
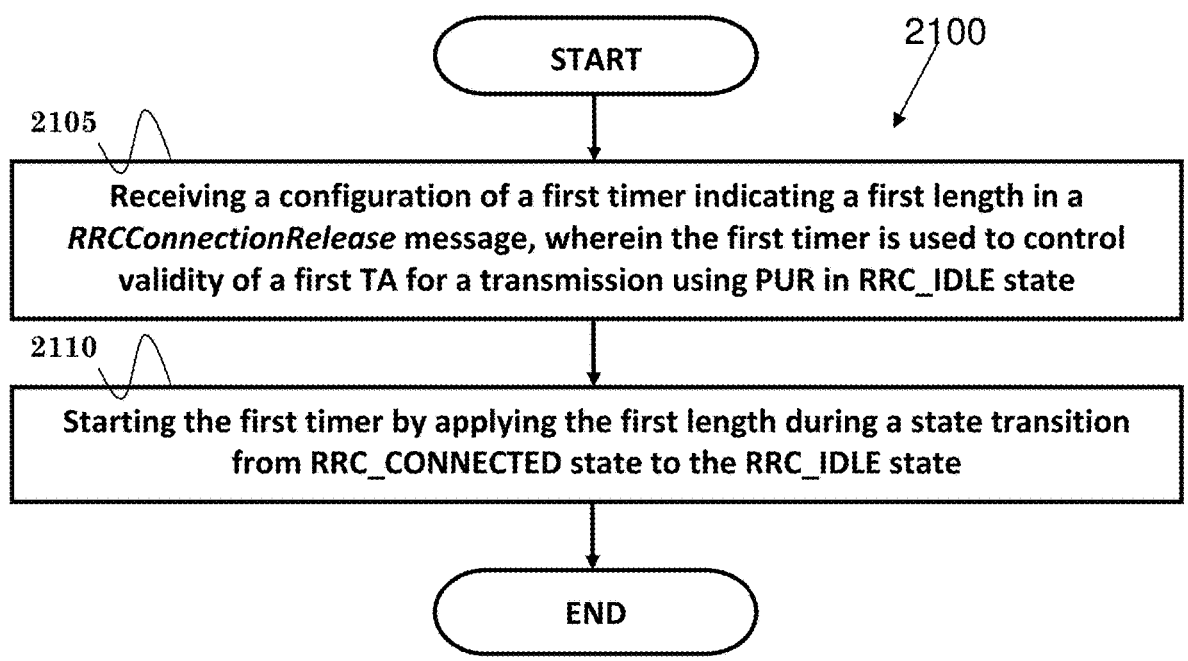
FIG. 21 is a flow chart according to one exemplary embodiment.

FIG. 21 is a flow chart 2100 according to one exemplary embodiment from the perspective of a UE. In step 2105, the UE receives a configuration of a first timer indicating a first length in a RRCConnectionRelease message, wherein the first timer is used to control validity of a first Timing Adjustment (TA) for a transmission using Preconfigured Uplink Resources (PUR) in RRC_IDLE state. In step 2110, the UE starts the first timer by applying the first length during a state transition from RRC_CONNECTED state to the RRC_IDLE state.

In one embodiment, the UE could perform a MAC (Media Access Control) reset in response to reception of the RRC-ConnectionRelease message.

In one embodiment, during the state transition from the RRC_CONNECTED state to the RRC_IDLE state, the UE could start the first timer after the MAC reset or upon entering the RRC_IDLE state. In one embodiment, the UE may not stop the first timer when performing the MAC reset.

In one embodiment, the UE could consider the first TA as invalid in response to initiating a Random Access (RA) procedure while the UE is in the RRC_IDLE state. The UE could consider the first TA as invalid by stopping the first timer or considering the first timer as expired.

In one embodiment, the UE could receive a configuration of a second timer indicating a second length, wherein the second timer is used to control validity of a second TA for a transmission in the RRC_CONNECTED state. The UE could start the second timer, in the RRC_IDLE state, by applying the second length while a RA procedure is ongoing.

Referring back to FIGS. 3 and 4, in one exemplary embodiment of a UE, the device 300 includes a program code 312 stored in the memory 310. The CPU 308 could execute program code 312 to enable the UE (i) to receive a configuration of a first timer indicating a first length in a RRCConnectionRelease message, wherein the first timer is used to control validity of a first TA for a transmission using PUR in RRC_IDLE state, and (ii) to start the first timer by applying the first length during a state transition from RRC_CONNECTED state to the RRC_IDLE state. Furthermore, the CPU 308 can execute the program code 312 to perform all of the above-described actions and steps or others described herein.

Figure 22:
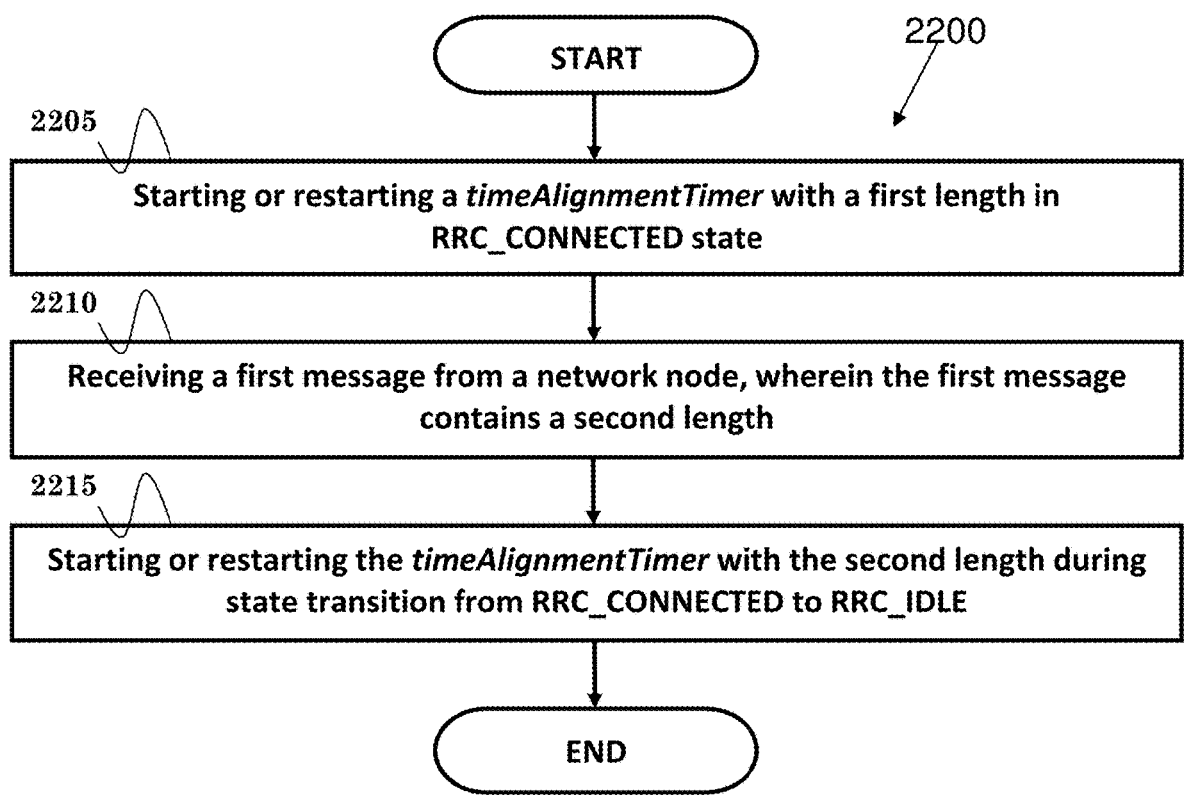
FIG. 22 is a flow chart according to one exemplary embodiment.

FIG. 22 is a flow chart 2200 according to one exemplary embodiment from the perspective of a UE. In step 2205, the UE starts or restarts a timeAlignmentTimer with a first length in RRC_CONNECTED state. In step 2210, the UE receives a first message from a network node, wherein the first message contains a second length. In step 2215, the UE starts or restarts the timeAlignmentTimer with the second length during state transition from RRC_CONNECTED to RRC_IDLE.

In one embodiment, the UE could start or restart the timeAlignmentTimer with the first length in response to receiving a Random Access Response in RRC_IDLE state. The UE could also start or restart the timeAlignmentTimer with the second length in response to receiving a second message in RRC_IDLE state.

In one embodiment, the first message could be a RRC-ConnectionRelease message. In one embodiment, the first message could contain Timing Alignment (TA) related configuration.

In one embodiment, the second message could be in response to a transmission using Preconfigured Uplink Resources (PUR). In one embodiment, the second message could contain Timing Alignment (TA) related configuration.

In one embodiment, the first length and the second length could be for a same Serving Cell.

Referring back to FIGS. 3 and 4, in one exemplary embodiment of a UE, the device 300 includes a program code 312 stored in the memory 310. The CPU 308 could execute program code 312 to enable the UE (i) to start or restart a timeAlignmentTimer with a first length in RRC_CONNECTED state, (ii) to receive a first message from a network node, wherein the first message contains a second length, and (iii) to start or restart the timeAlignment-Timer with the second length during state transition from RRC_CONNECTED to RRC_IDLE. Furthermore, the CPU 308 can execute the program code 312 to perform all of the above-described actions and steps or others described herein.

Figure 23:
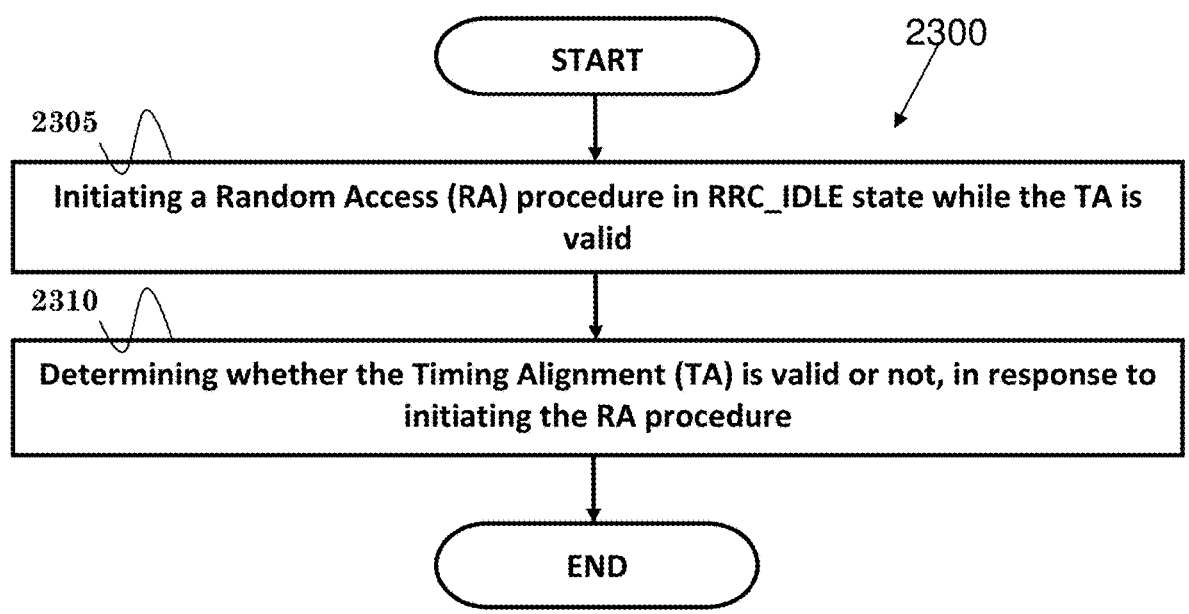
FIG. 23 is a flow chart according to one exemplary embodiment.

FIG. 23 is a flow chart 2300 according to one exemplary embodiment from the perspective of a UE. In step 2305, the UE initiates a Random Access (RA) procedure in RRC_IDLE state while the TA is valid. In step 2310, the UE determines whether the Timing Alignment (TA) is valid or not, in response to initiating the RA procedure.

In one embodiment, the UE could initiate the RA procedure in response to reception of a PDCCH order from a network node.

In one embodiment, if the UE considers the TA valid, the UE could start a TA timer, restart a TA timer, and/or resume a TA timer. If the UE considers the TA invalid, the UE could stop a TA timer, suspend a TA timer, and/or consider a TA timer as expired. Furthermore, if the UE considers the TA invalid, the UE may not flush a HARQ buffer for transmission using PUR.

Referring back to FIGS. 3 and 4, in one exemplary embodiment of a UE, the device 300 includes a program code 312 stored in the memory 310. The CPU 308 could execute program code 312 to enable the UE (i) to initiate a Random Access (RA) procedure in RRC_IDLE state while the TA is valid, and (ii) to determine whether the Timing Alignment (TA) is valid or not, in response to initiating the RA procedure. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment), comprising:
   receiving a first configuration, indicating a Preconfigured Uplink Resource (PUR) on Physical Uplink Shared Channel (PUSCH) or Narrowband Physical Uplink Shared Channel (NPUSCH) and a first length of a first timer, in a RRCConnectionRelease message, wherein the first timer is used to control validity of a first Timing Adjustment (TA) for a transmission using the PUR in RRC_IDLE state;
   performing the transmission using the PUR in the RRC_IDLE state if the first TA is valid; and
   considering the first TA as invalid in response to initiating a Random Access (RA) procedure while the UE is in the RRC_IDLE state.

2. The method of claim 1, wherein the UE considers the first TA as invalid by stopping the first timer or considering the first timer as expired.

3. The method of claim 1, further comprising:
   starting or restarting the first timer by applying the first length during a state transition from RRC_CONNECTED state to the RRC_IDLE state.

4. The method of claim 1, wherein the UE determines whether the first TA is valid or not based on whether the first timer is running or not.

5. The method of claim 1, wherein the UE performs a MAC (Media Access Control) reset in response to reception of the RRCConnectionRelease message, and during a state transition from RRC_CONNECTED state to the RRC_IDLE state, the UE starts the first timer after the MAC reset.

6. The method of claim 3, wherein during the state transition from the RRC_CONNECTED state to the RRC_IDLE state, the UE starts the first timer upon entering the RRC_IDLE state.

7. The method of claim 1, wherein the UE performs a MAC (Media Access Control) reset in response to reception of the RRCConnectionRelease message, and the UE does not stop the first timer when performing the MAC reset.

8. The method of claim 1, further comprising:
   receiving a second configuration indicating a second length of a second timer, wherein the second timer is used to control validity of a second TA for a transmission in the RRC_CONNECTED state.

9. The method of claim 8, further comprising:
   starting the second timer, in the RRC_IDLE state, by applying the second length while a RA procedure is ongoing.

10. A method of a UE (User Equipment), comprising:
    receiving a first configuration, indicating a Preconfigured Uplink Resource (PUR) on Physical Uplink Shared Channel (PUSCH) or Narrowband Physical Uplink Shared Channel (NPUSCH) and a first length of a first timer, in a RRCConnectionRelease message, wherein the first timer is used to control validity of a first Timing Adjustment (TA) for a transmission using the PUR in RRC_IDLE state;
    starting or restarting the first timer by applying the first length during a state transition from RRC_CONNECTED state to the RRC_IDLE state; and
    performing the transmission using the PUR in the RRC_IDLE state if the first TA is valid.

11. The method of claim 10, wherein the UE determines whether the first TA is valid or not based on whether the first timer is running or not.

12. The method of claim 10, wherein the UE performs a MAC (Media Access Control) reset in response to reception of the RRCConnectionRelease message, and during the state transition from the RRC_CONNECTED state to the RRC_IDLE state, the UE starts the first timer after the MAC reset.

13. The method of claim 10, wherein during the state transition from the RRC_CONNECTED state to the RRC_IDLE state, the UE starts the first timer upon entering the RRC_IDLE state.

14. The method of claim 10, wherein the UE performs a MAC (Media Access Control) reset in response to reception of the RRCConnectionRelease message, and the UE does not stop the first timer when performing the MAC reset.

15. The method of claim 10, further comprising:
    considering the first TA as invalid in response to initiating a Random Access (RA) procedure while the UE is in the RRC_IDLE state.

16. The method of claim 15, wherein the UE considers the first TA as invalid by stopping the first timer or considering the first timer as expired.

17. The method of claim 10, further comprising:
    receiving a second configuration indicating a second length of a second timer, wherein the second timer is used to control validity of a second TA for a transmission in the RRC_CONNECTED state.

18. The method of claim 17, further comprising:
    starting the second timer, in the RRC_IDLE state, by applying the second length while a RA procedure is ongoing.

19. A User Equipment (UE), the UE comprising:
    a control circuit;
    a processor installed in the control circuit; and
    a memory installed in the control circuit and coupled to the processor;
    wherein the processor is configured to execute a program code stored in the memory to:
      receive a first configuration, indicating a Preconfigured Uplink Resource (PUR) on Physical Uplink Shared Channel (PUSCH) or Narrowband Physical Uplink Shared Channel (NPUSCH) and a first length of a first timer, in a RRCConnectionRelease message, wherein the first timer is used to control validity of a first Timing Adjustment (TA) for a transmission using the PUR in RRC_IDLE state;
      perform the transmission using the PUR in the RRC_IDLE state if the first TA is valid; and
      consider the first TA as invalid in response to initiating a Random Access (RA) procedure while the UE is in the RRC_IDLE state.

20. The UE of claim 19, wherein the processor is further configured to execute a program code stored in the memory to:
    start or restart the first timer by applying the first length during a state transition from RRC_CONNECTED state to the RRC_IDLE state.

21. A User Equipment (UE), the UE comprising:
a control circuit;
a processor installed in the control circuit; and
a memory installed in the control circuit and coupled to the processor;
wherein the processor is configured to execute a program code stored in the memory to:
receive a first configuration, indicating a Preconfigured Uplink Resource (PUR) on Physical Uplink Shared Channel (PUSCH) or Narrowband Physical Uplink Shared Channel (NPUSCH) and a first length of a first timer, in a RRCConnectionRelease message, wherein the first timer is used to control validity of a first Timing Adjustment (TA) for a transmission using the PUR in RRC_IDLE state;
start or restart the first timer by applying the first length during a state transition from RRC_CONNECTED state to the RRC_IDLE state; and
perform the transmission using the PUR in the RRC_IDLE state if the first TA is valid.

\* \* \* \* \*